(12) United States Patent
Nam et al.

(10) Patent No.: US 11,089,549 B2
(45) Date of Patent: Aug. 10, 2021

(54) POWER-EFFICIENT DRX FOR MULTI-LINK COMMUNICATION

(71) Applicant: QUALCOMM Incorporated, San Diego, CA (US)

(72) Inventors: Wooseok Nam, San Diego, CA (US); Tao Luo, San Diego, CA (US); Olufunmilola Omolade Awoniyi-Oteri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/572,560

(22) Filed: Sep. 16, 2019

(65) Prior Publication Data

US 2020/0120604 A1  Apr. 16, 2020

Related U.S. Application Data

(60) Provisional application No. 62/745,280, filed on Oct. 12, 2018.

(51) Int. Cl.
*H04W 52/02* (2009.01)
*H04W 76/28* (2018.01)

(52) U.S. Cl.
CPC ....... *H04W 52/0229* (2013.01); *H04W 76/28* (2018.02)

(58) Field of Classification Search
CPC ............. H04W 52/0229; H04W 76/28; H04W 52/028; H04W 52/0216

(Continued)

(56) References Cited

U.S. PATENT DOCUMENTS

| 2013/0331081 A1* | 12/2013 | Rune ................. H04W 52/0229 455/418 |
| 2018/0167883 A1 | 6/2018 | Guo et al. |
| 2018/0255607 A1 | 9/2018 | Nagaraja et al. |

OTHER PUBLICATIONS

Huawei et al., "Consideration on DRX with Beam Management", 3GPP Draft; R2-1706721 Consideration on DRX With Beam Management V1.1, 3rd Generation Partnership Project (3GPP), Mobile Competence Centre, 650, Route Des Lucioles, F-06921 Sophia-Antipolis Cedex; vol. RAN WG2, No. Qingdao, China; May 27, 2017-May 29, 2017, Jun. 26, 2017 (Jun. 26, 2017), XP051301221, 4 pages, Retrieved from the Internet: URL:http://www.3gpp.org/ftp/Meetings_3GPP_SYNC/RAN2/Docs/ [retrieved on Jun. 26, 2017].

(Continued)

*Primary Examiner* — Eugene Yun
(74) *Attorney, Agent, or Firm* — Procopio, Cory, Hargreaves & Savitch LLP

(57) ABSTRACT

To provide for power saving and the flexibility to activate a sufficient number of links without sacrificing link performance during a discontinuous reception (DRX) cycle, a method to selectively activate a subset of links is disclosed. The method includes a user equipment (UE) receiving an indication from a base station to use a subset of a plurality of antenna ports. The UE may enter a sleep mode as part of the DRX cycle. The UE may activate the subset of the plurality of antenna ports indicated during a part of the DRX cycle such as during periodic wake up intervals. The UE may monitor for communication from the base station during the part of the DRX cycle using the plurality of antenna ports. If the UE detects the communication, the device may activate one or more additional links to prepare for data communication during another part of the DRX cycle.

30 Claims, 16 Drawing Sheets

(58) Field of Classification Search
USPC .......................................................... 455/574
See application file for complete search history.

(56) References Cited

OTHER PUBLICATIONS

International Search Report and Written Opinion—PCT/US2019/051553—ISA/EPO—dated Nov. 8, 2019.

* cited by examiner

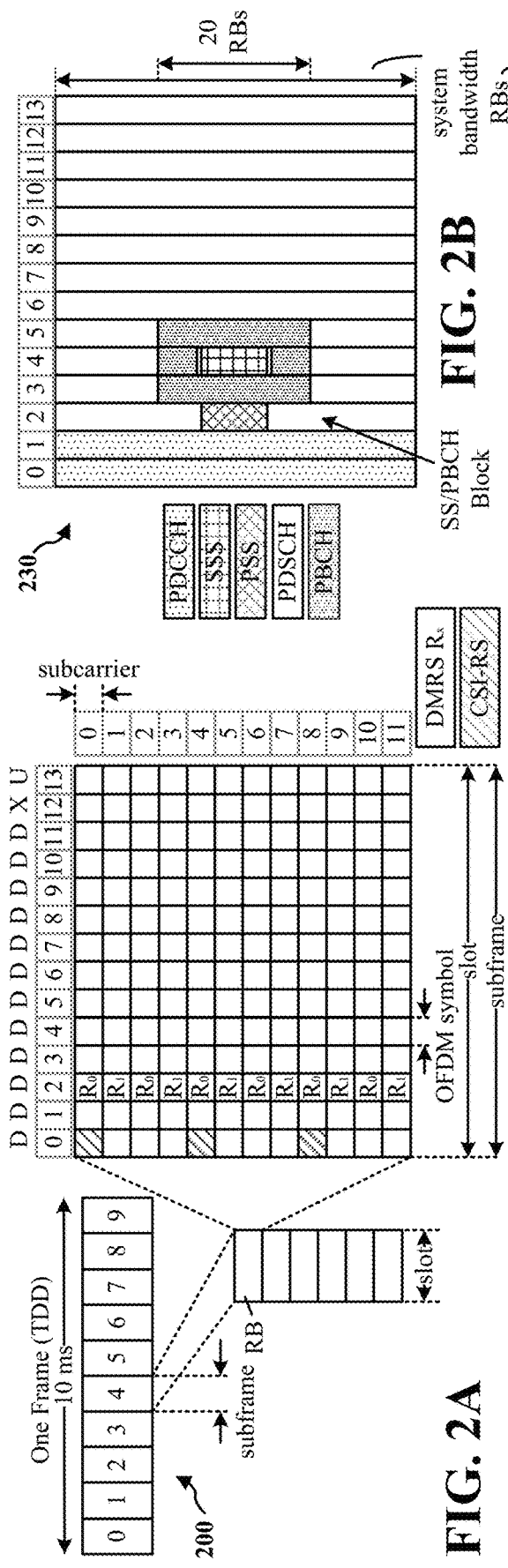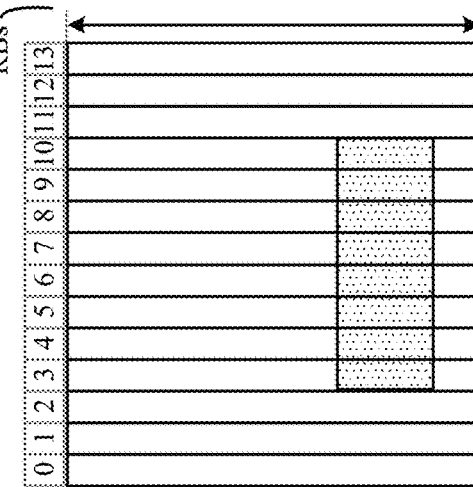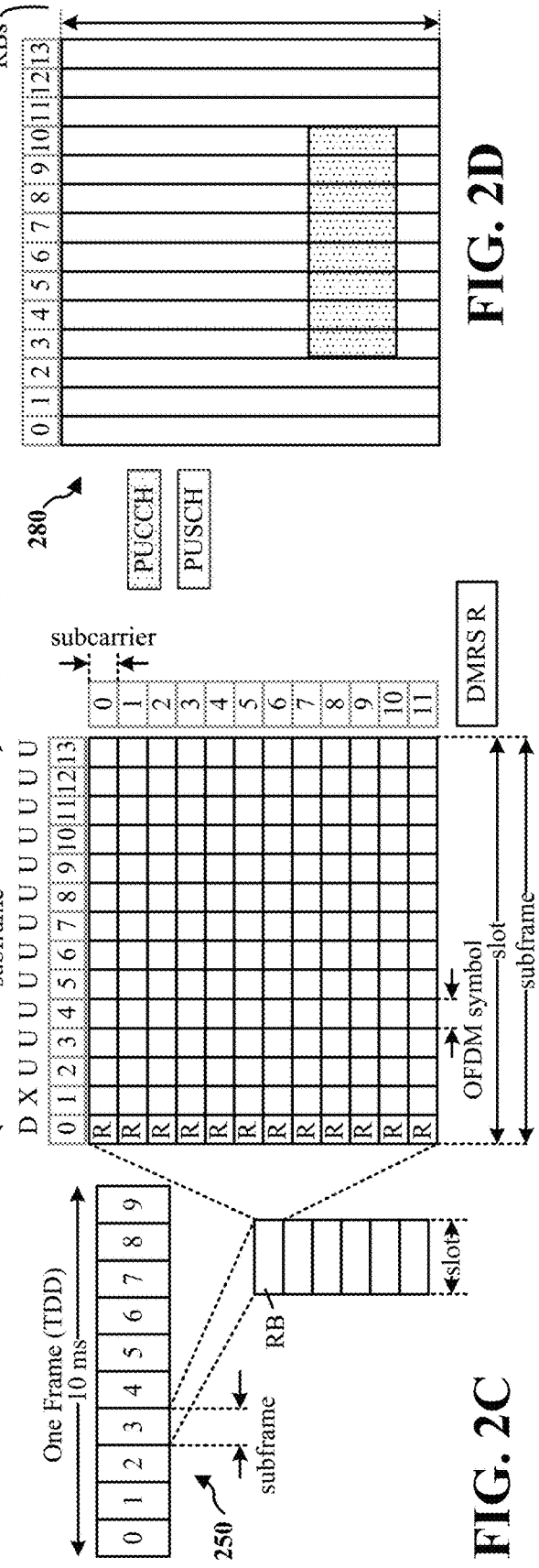
FIG. 2A  FIG. 2B  FIG. 2C  FIG. 2D

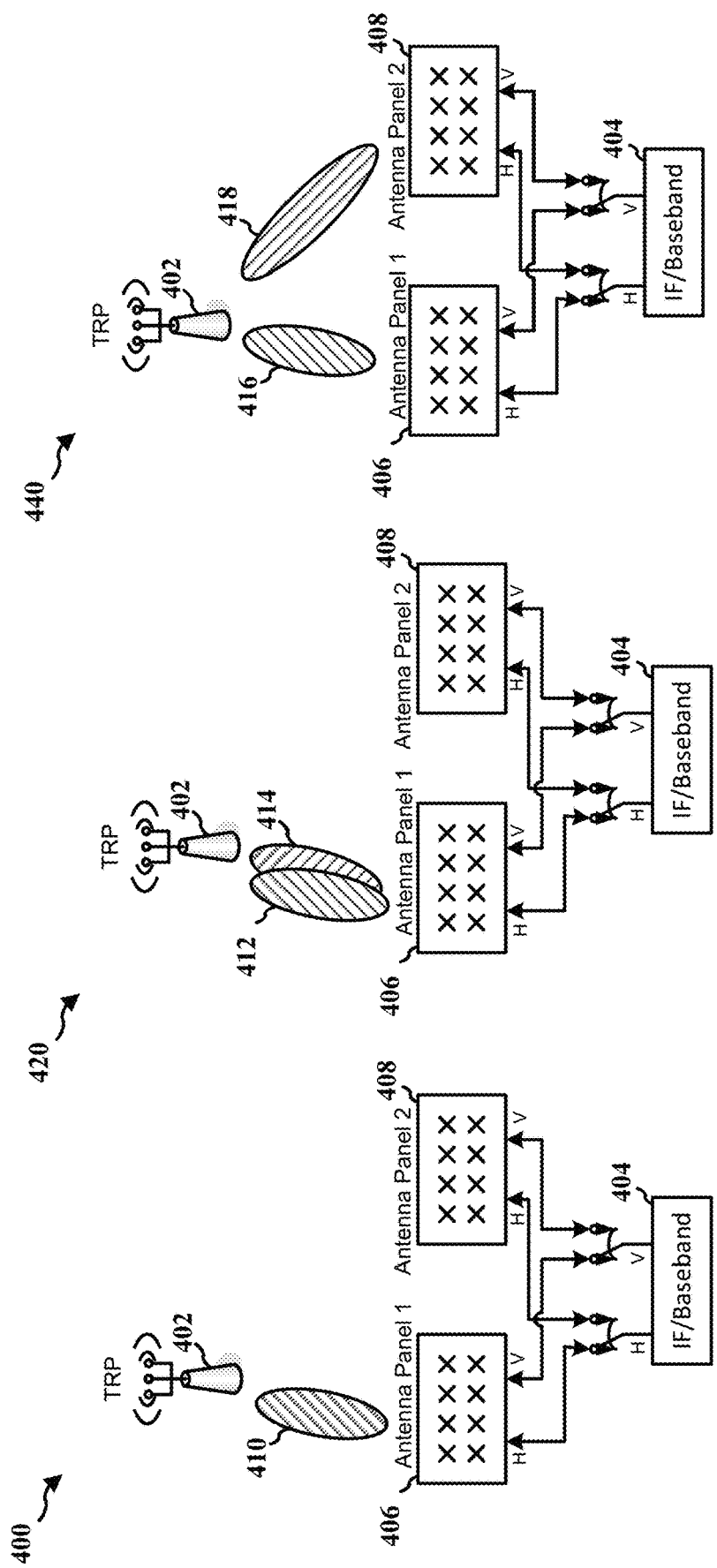

US 11,089,549 B2

POWER-EFFICIENT DRX FOR MULTI-LINK COMMUNICATION

CROSS REFERENCE TO RELATED APPLICATION(S)

This application claims the benefit of U.S. Provisional Patent Application Ser. No. 62/745,280, entitled "POWER-EFFICIENT DRX FOR MULTI-LINK COMMUNICATION" and filed on Oct. 12, 2018, which is expressly incorporated by reference herein in its entirety.

BACKGROUND

Technical Field

The present disclosure relates generally to communication systems, and more particularly, to wireless communication comprising discontinuous reception (DRX) operation.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G/NR is part of a continuous mobile broadband evolution promulgated by Third Generation Partnership Project (3GPP) to meet new requirements associated with latency, reliability, security, scalability (e.g., with Internet of Things (IoT)), and other requirements. 5G/NR includes services associated with enhanced mobile broadband (eMBB), massive machine type communications (mMTC), and ultra-reliable low latency communications (URLLC). Some aspects of 5G/NR may be based on the 4G Long Term Evolution (LTE) standard. There exists a need for further improvements in 5G/NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may facilitate wireless communication at a user equipment (UE). For example, the apparatus sends to or receives from a base station an indication of at least one antenna port. The apparatus enters a sleep mode as part of a DRX cycle. The apparatus The apparatus monitors for communication from the base station during the DRX cycle using the at least one antenna port.

In another aspect of the disclosure, a method, a computer-readable medium, and an apparatus are provided. The apparatus may facilitate wireless communication at a base station. For example, the apparatus transmits to or receives from a UE an indication of at least one antenna port at the UE for use in a DRX cycle. The apparatus transmits communication to the UE according to the DRX cycle based on the at least one antenna port.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 4A, 4B, and 4C are diagrams illustrating a UE using one or more beams from one or more antenna ports to communicate with a transmission reception point (TRP), in accordance with certain aspects of the disclosure.

DETAILED DESCRIPTION

Figure 1:
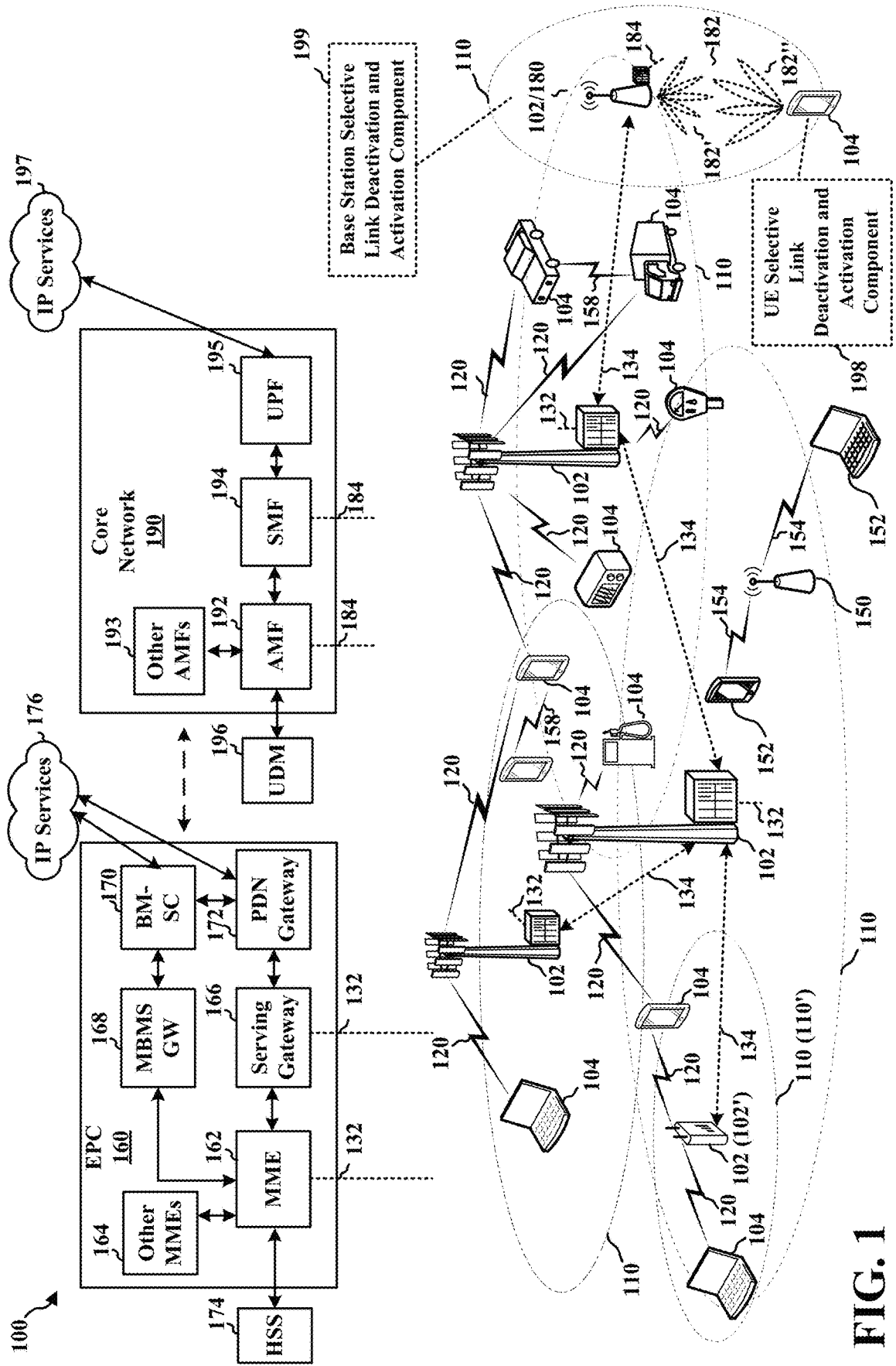
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" are used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G/NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, e.g., base station 180, may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage one or more aspects of wireless communication via deactivating and/or activating selective links (or beams) for the UE 104 during the DRX cycles. As an example, in FIG. 1, the UE 104 may include a UE selective link deactivation and activation component 198 configured to send to or receive from a base station an indication of at least one antenna port. The UE selective link deactivation and activation component 198 may also be configured to enter a sleep mode as part of a DRX cycle. The UE selective link deactivation and activation component 198 may also be configured to monitor for communication from the base station during the DRX cycle using the at least one antenna port.

Still referring to FIG. 1, in certain aspects, the base station 180 may be configured to manage one or more aspects of wireless communication via communicating with a UE using activated selective links during the DRX cycles. As an example, in FIG. 1, the base station 180 may include a base station selective link deactivation and activation component 199 configured to transmit to or receive from a UE an indication of at least one antenna port at the UE for use in a DRX cycle. The base station selective link deactivation and activation component 199 may also be configured to transmit communication to the UE according to the DRX cycle based on the at least one antenna port.

Although the following description may be focused on 5G/NR, the concepts described herein may be applicable to other similar areas, such as LTE, LTE-A, CDMA, GSM, and/or other wireless technologies, in which a subset of panels of antenna arrays of a UE may be selectively activated and/or deactivated.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A to 2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
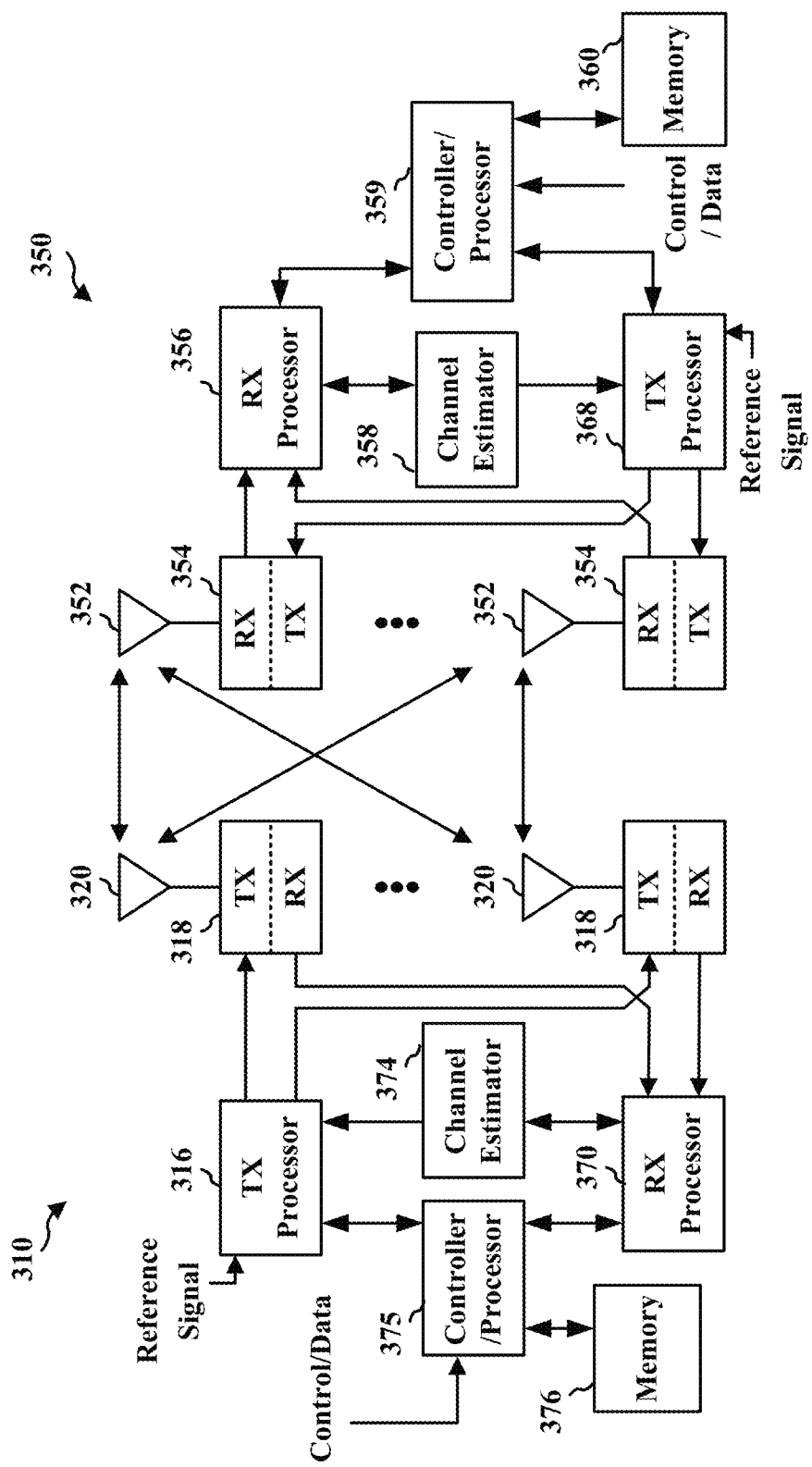
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 of the UE 350 may be configured to perform aspects in connection with the UE selective link deactivation and activation component 198 of FIG. 1.

At least one of the TX processor 316, the RX processor 370, and the controller/processor 375 of the base station 310 may be configured to perform aspects in connection with the base station selective link deactivation and activation component 199 of FIG. 1.

Multi-link or multi-beam communication uses multiple antenna beams to increase throughput and/or improve reliability of communications. For example, in multiple-input and multiple-output (MIMO) antenna technology, a device (e.g., a portable wireless communication device such as the UE 104 or the UE 350) may comprise multiple antenna panels or multiple antenna arrays corresponding to multiple antenna ports. The device may activate, form, and/or steer multiple antenna beams using an array of antenna elements corresponding to one or more antenna ports to achieve spatial multiplexing and/or transmit diversity. While the performance gain afforded by a multi-link communication may be desirable, it may also be desirable for devices to meet stringent power requirements. To conserve power, a device may enter DRX operation in which the device may enter a low power mode (sometimes referred to as a "sleep mode") during which the communication links and most communication functions at the device are deactivated. In the sleep mode, the UE may power down the antenna panels or antenna arrays. The device may periodically wake up for a brief interval (sometimes referred to as an "on duration") to search for a control message, a reference signal, a pilot, a preamble, and/or other types of activation signals to determine if the device needs to exit the sleep mode so it may transmit and/or receive data. If the device does not detect such an activation signal during the on duration, the device may go back into the sleep mode until the next cycle of the on duration. For increased power savings, it may be desirable that the device minimize the number of links activated in the DRX operation. However, it may also be desirable for a device to activate a sufficient number of links during the DRX operation to meet throughput and reliability requirements in a dynamic signaling environment.

To provide for increased power savings and the flexibility to activate a sufficient number of links without sacrificing link performance during the DRX operation, example techniques disclosed herein facilitate a device activating one or a subset of available links during the DRX operation. This may allow some antenna elements or antenna arrays to be powered off (or deactivated) during the on duration of a DRX cycle. For example, the deactivating of a link by the UE may include deactivating one or more antennas or antenna arrays corresponding to the link or deactivating an antenna port corresponding to the link. The UE may measure the strength of signals received on the multiple links. In some examples, based on the link measurements, the device may determine the strongest link or a subset of the links with the strongest strengths. The links may correspond to beams used to send or receive communications between the device and a base station. In some examples, the device may deactivate all links before it enters the sleep mode of the DRX operation. During the periodic wake up intervals (or on durations), the device may search for an activation signal from a network using the strongest link or a subset of the strongest links. In some examples, to provide the flexibility for the device and the network to collaboratively determine the number of links to use for communication, the device may be configured to report the link measurements to the network. In some examples, the device may request the network to provide a certain number of links to be used for future data communication based on the link measurements before the device enters the sleep mode.

In some examples, if the device detects the activation signal during the periodic wake up intervals of the DRX cycle, the device may activate one or more additional links to prepare for data communication. In some examples, the network may configure the number of links activated by the device based on the link measurements received from the device or based on the number of links requested by the device. The device may use the additional links for spatial multiplexing to increase throughput or for diversity combining to increase reliability. The network may also change the number of links used by the device as the signaling environment changes. In some examples, if the device does not detect the activation signal during a wake up interval, the device may deactivate the strongest link or the subset of the strongest links used to search for the activation signal and may reenter the sleep mode. Thus, it should be appreciated that increased power savings may be achieved without sacrificing link performance by activating a small subset of the links to search for the activation signal during the periodic wake up intervals in DRX operation, by activating additional links on demand, and/or by providing for the capability for the network to determine the number of links to use.

In some examples, while operating in an extended sleep mode, the device may periodically turn on a low-power wake-up subsystem to search for a Wake Up Signal (WUS) using the strongest link or a subset of the strongest links at a time offset before the periodic wake up intervals. If the device does not detect the WUS, the device may deactivate all links to reenter the sleep mode. In some examples, if the device detects the WUS, the device may activate additional links to search for a control message from the network during the wake up interval. The control message may be used by the network to configure the number of links used by the device for full data communication. If the device detects the control message during the wake up interval, the device may further activate additional links to use the number of links as configured by the control message for transmitting and receiving data. If the device does not detect the control message during the wake up interval, the device may wait for a period of data inactivity before deactivating all the links and may reenter the sleep mode. It should be appreciated that searching for the pre-wake up signal using the low-power wake up subsystem may consume less power than activating the device to search for the control message during the periodic wake up intervals. In some examples, the searching for the pre-wake up signal using the low-power wake up subsystem may also allow for a gradual ramp up of the activation of the additional links to enable data communication.

FIGS. 4A, 4B, and 4C are diagrams illustrating a UE using one or more beams from one or more antenna ports to communicate with a transmission reception point (TRP) 402 in accordance with certain aspects of the disclosure. The TRP 402 may be comprised in a base station (e.g., the base station 180 and/or the base station 310).

The UE may have the capability of forming or steering multiple different antenna beams that may be selectively activated for spatial multiplexing to increase throughput or for diversity combining to increase reliability when communicating with the TRP 402. The multiple antenna beams may also be called multiple links. As used herein, the terms "beams" and "links," and variants thereof, may be used interchangeably. The multiple beams may be generated by an array of antenna elements positioned on one or more antenna panels or antenna ports, for example panel 1 406 and panel 2 408. An antenna panel may also be referred to as a set of antennas or an antenna array. In some examples, the antenna elements may be positioned on multiple antenna panels to facilitate ameliorating increased interference caused when progressively more antenna elements are located closely together on an antenna panel, for example, due to power constraints on the antenna panel. In some examples, the antenna elements may be positioned on multiple antenna panels to facilitate increasing spatial diversity, for example, by locating antenna elements further apart on different antenna panels. The UE may control the phase of the array of antenna elements on an antenna panel to activate, shape, and/or steer one or more beams from the antenna panel for achieving performance gain and/or for achieving power savings. In some examples, the UE may also selectively activate or deactivate the antenna panels (or individual antenna elements within an antenna panel) for achieving performance gain and/or for achieving power savings. The UE may control the phase of antenna elements and may selectively control the antenna panels through an RF component, IF component, and/or a baseband processor 404.

FIG. 4A depicts a first scenario 400 in which the UE activates a single beam 410 from antenna panel 1 406. The antenna panel 2 408 is not used in the example first scenario 400 and may be turned off. As presented herein, the UE may use the single beam 410 to search for a WUS and/or control message transmitted from the TRP 402 during the on duration of a DRX cycle and/or to search for a WUS or other activation signals during another part of the DRX cycle or during active mode communication. In some examples, the single beam 410 may be the beam determined by the UE to have the strongest received signal strength during a beam monitoring period of the DRX cycle during which the UE measures the received signal strengths of multiple beams. It should be appreciated that using the single beam 410 and/or the single panel (e.g., the antenna panel 1 406) may reduce power consumption by the UE. In some examples, the UE may use the single beam 410 for DL and UL communication with the TRP 402 when, for example, the signaling environment or the link budget allows it. In some examples, one or more antenna elements of the antenna panel 1 406 that are not needed for sending or receiving on the single beam 410 may be powered off or deactivated during communication by the UE.

FIG. 4B depicts a second scenario 420 in which the UE communicates using two beams 412, 414 from the antenna panel 1 406. Similar to the example scenario 400 of FIG. 4A, the antenna panel 2 408 is not used and may be turned off. As presented herein, the UE may also use the dual beams 412, 414 to search for a WUS and/or control message transmitted from the TRP 402 during the on duration of a DRX cycle, to search for a WUS or other activation signals during another part of the DRX cycle, and/or for data communication with the TRP 402. Activating the dual beams 412, 414 may consume more power than the single beam 410 of FIG. 4A, but may allow the UE to use spatial multiplexing to increase throughput and/or to use diversity combining to improve reliability in more challenging signaling environments. In some examples, the UE may communicate with the TRP 402 using the dual beams 412, 414 and then may select one of the beams 412, 414 when monitoring for communications from the TRP 402 during DRX operation.

FIG. 4C depicts a third scenario 440 in which the UE communicates using a first beam 416 from the antenna panel 1 406 and a second beam 418 from the antenna panel 2 408. The UE may use the dual beams 416, 418 for data communication with the TRP 402. As presented herein, the UE may select either the first beam 416 or the second beam 418 when monitoring for communication from the TRP 402 during DRX operation. In some examples, the UE may activate the other beam, e.g., upon detecting communication from the TRP 402, such as a WUS or control channel. The UE may activate the other beam to receive the control channel and/or data (e.g., via a data channel). It should be appreciated that activating the dual beams 416, 418, one from each of the two antenna panels 406, 408, may consume more power than activating both beams 412, 414 from the same antenna panel (e.g., the antenna panel 1 406) of FIG. 4B, but may allow the UE to improve diversity combining due to the dual beams 416, 418 of FIG. 4C being located further apart than the dual beams 412, 414 of FIG. 4B.

Figures 5A, 5B:
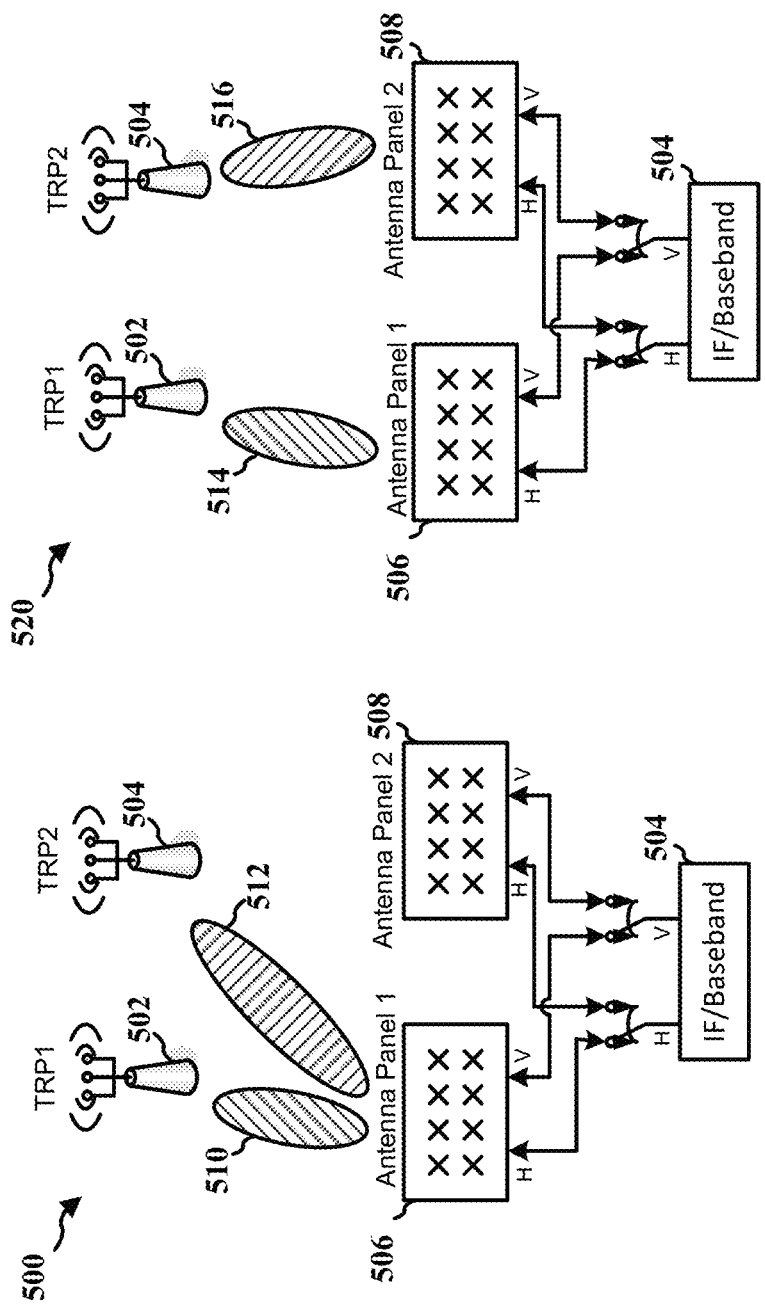
FIGS. 5A and 5B are diagrams illustrating a UE using multiple beams from one or more antenna ports to communicate with two TRPs, in accordance with certain aspects of the disclosure.

FIGS. 5A and 5B are diagrams illustrating a UE using multiple beams from one or more antenna ports to communicate with multiple TRPs in accordance with certain aspects of the disclosure.

FIG. 5A depicts a first scenario 500 in which the UE uses a first beam 510 from an antenna panel 1 506 to communicate with a TRP1 502 and a second beam 512 also from the antenna panel 1 506 to communicate with a TRP2 504. The UE may use the first beam 510 to search for a control message transmitted from the TRP1 502 during the on duration of a DRX cycle and/or to search for a wake up signal or other activation signals during another part of the DRX cycle from the TRP1 502. In some examples, the first beam 510 may be the beam determined by the UE to have the strongest received signal strength from the TRP1 502 during a beam monitoring period of the DRX cycle during which the UE measures the received signal strengths of different received beams. Similarly, the UE may use the second beam 512 to search for a control message transmitted from the TRP2 504 during the on duration of a DRX cycle and/or to search for a wake up signal or other activation signals during another part of the DRX cycle from the TRP2 504. In some examples, the second beam 512 may be the beam determined by the UE to have the strongest received signal strength from the TRP2 504 during the beam monitoring period. In some examples, the UE may select either the first beam 510 or the second beam 512 to monitor for communication from the TRP1 502 and/or the TRP2 504 during a DRX cycle. In some examples, the antenna panel 2 408 may remain deactivated for example, until communication is detected. In some examples, the UE may activate the other beam, for example, upon detecting communication from the TRP1 502 and/or the TRP2 504.

FIG. 5B depicts a second scenario 520 in which the UE uses a first beam 514 from the antenna panel 1 506 to communicate with the TRP1 502 and a second beam 516 from the antenna panel 2 508 to communicate with the TRP2 504. Activating the dual beams 514, 516, one from each of the two antenna panels 506, 508, may consume more power than activating both beams from the same antenna panel, as shown in the example scenario 500 of FIG. 5A, but may allow the UE to improve diversity combining due to the dual beams 514, 516 being located further apart than the dual beams 510, 512 of FIG. 5A. In some examples, the UE may select either the first beam 514 or the second beam 516 to monitor for communication from the TRP1 502 and/or the TRP2 504 during a DRX cycle. In some examples, the UE may activate the other beam, for example, upon detecting communication from the TRP1 502 and/or the TRP2 504.

Figure 6:
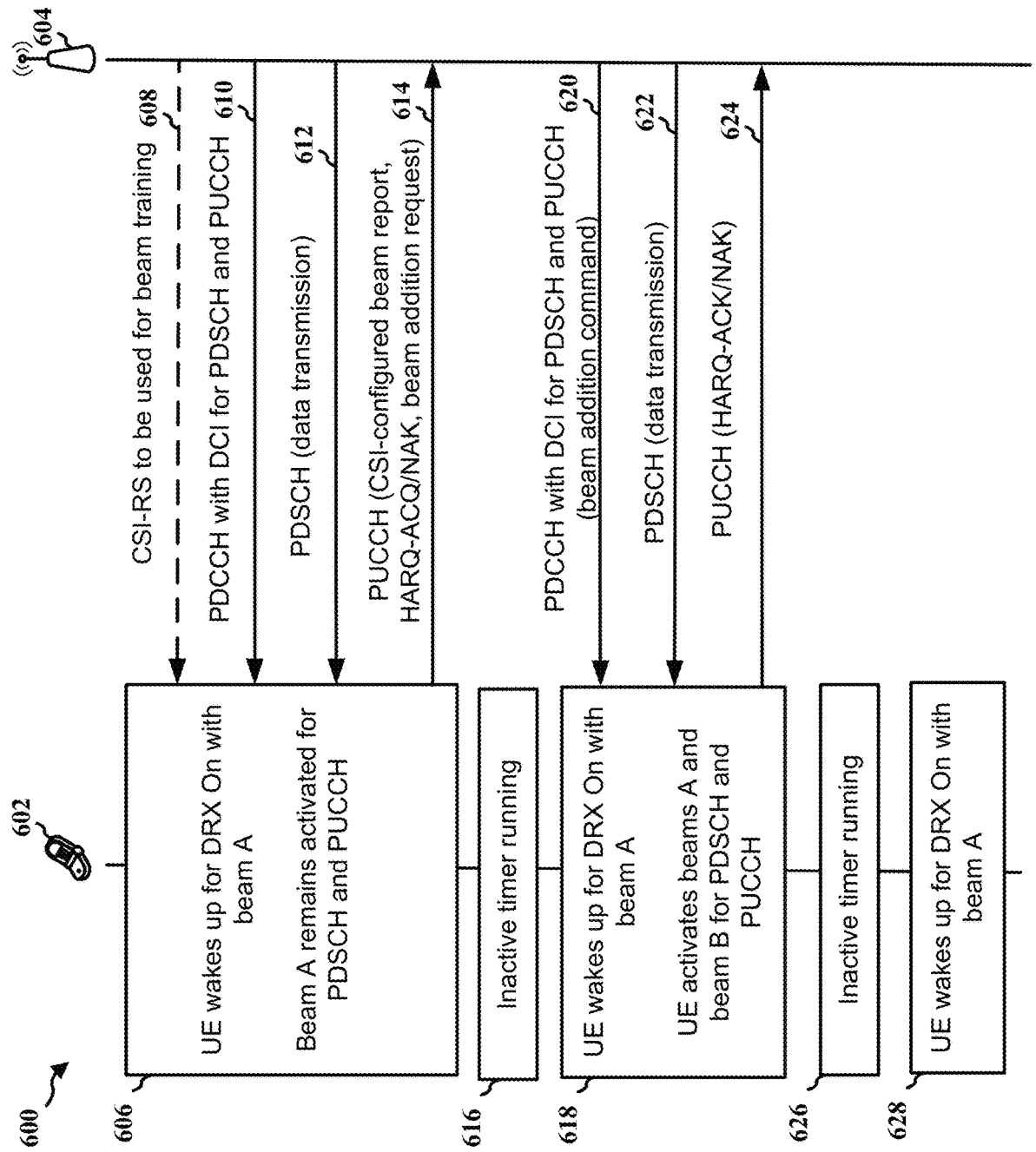
FIG. 6 is a call flow diagram illustrating an implementation of a UE exchanging messages with a base station to increase the number of beams used for data communication during the DRX cycle, in accordance with certain aspects of the disclosure.

FIG. 6 is a call flow diagram 600 illustrating an implementation of a UE 602 exchanging messages with a base station 604 to increase the number of beams used for data communication during the DRX cycle, in accordance with certain aspects of the disclosure. One or more aspects of the UE 602 may be implemented by the UE 104 of FIG. 1 and/or the UE 350 of FIG. 3. One or more aspects of the base station 604 may be implemented by the base station 180 of FIG. 1 and/or the base station 310 of FIG. 3.

It should be appreciated that while the wireless communication in diagram 600 includes one base station 604 in communication with one UE 602, in additional or alternative examples, the base station 604 may be in communication with any suitable quantity of UEs and/or other base stations, and/or the UE 602 may be in communication with any suitable quantity of base stations and/or other UEs. Thus, while certain of the transmissions between the base station 604 and the UE 602 are described as uplink transmissions and downlink transmissions, in other examples, any of the transmissions may additionally or alternatively be sidelink transmissions.

In the illustrated example, the UE 602 and the base station 604 are in communication.

Furthermore, the UE 602 is initially operating in a DRX mode (e.g., in a sleep mode of the DRX cycle).

At 606, the UE 602 may wake up from the sleep mode during the on duration of the DRX cycle to search for a control message from the base station 604 using a single beam, beam A. In one aspect, the UE 602 may determine beam A to be the beam with the strongest received signal strength from the base station 604 during a beam monitoring period of a previous DRX cycle during which the UE 602 measures the received signal strengths of one or more beams from the base station 604. Beam A may be determined as the strongest beam, for example, based on prior communication with the base station 604.

For example, the base station 604 may transmit channel state information reference signals (CSI-RS) 608 to enable the UE 602 to measure one or more beams. The UE 602 may activate a series of beams to measure the signal strength of the CSI-RS 608 received by the series of beams. The UE 602 may store the received signal strengths of the multiple beams. After the beam measurement is completed, the UE 602 may activate beam A to search for the control message from the base station 604 during the on duration. In one aspect, the control message may be the DCI of the PDCCH. In one aspect, the UE 602 may activate more than one beam to search for the control message from the base station 604. The UE may monitor for a WUS prior to monitoring for the control message. Thus, the UE may activate additional antenna ports/beams upon detecting the WUS in order to monitor for the control message.

At 610, the base station 604 may transmit the PDCCH with DCI to configure the UE 602 for receiving PDSCH and PUCCH. If the UE 602 detects the DCI using beam A, the UE 602 may keep beam A activated for the DL and UL communication. If the UE 602 does not detect the DCI using beam A, the UE 602 may continue to monitor the channel for the DCI or the PDCCH for an interval of time corresponding to the on duration of the DRX cycle. In some examples, when the on duration expires without the UE 602 detecting the DCI, the UE 602 may deactivate beam A and may enter the sleep mode until the next on duration of the DRX cycle.

The base station 604 may transmit DL data on PDSCH 612. The UE 602 may receive the PDSCH using beam A. In another aspect, the UE 602 may activate additional beams to receive the PDSCH based on the beam measurements carried out using the CSI-RS 608. For example, the UE 602 may use the additional links for spatial multiplexing to increase throughput and/or for diversity combining to increase reliability.

The UE 602 may transmit PUCCH 614 using beam A. The PUCCH 614 may include the beam measurements carried out using the CSI-RS 608, and the HARQ-ACK/NACK for the DL data received on the PDSCH 612. The UE 602 may also transmit a request for a number of beams to be used by the UE 602 for data transmission based on the beam measurements. For example, the UE 602 may request additional beams if the beam measurements indicate that sufficient signal strengths were received on beams other than beam A to support data communication of a desired quality of service (QoS). The beam adjustment request (e.g., a beam addition request, a beam addition command, a beam reduction request, or a beam reduction command) may serve as an indirect indication to the UE of one or more antenna ports or one or more antenna elements used for communication between the UE 602 and the base station 604. The base station 604 may receive the beam measurements reported by the UE 602 and the number of beams requested by the UE 602 and may determine the number of beams to configure the UE 602 for data communication. For example, if the reported beam measurements indicate that sufficient signal strengths were received on two or beams or if the UE 602 requests additional beams, the base station may configure the UE 602 to increase the number of beams. In some examples, the base station 604 may autonomously determine (e.g., without receiving reported beam measurements from the UE 602 and/or a request for additional beams) that additional beams may be desirable to increase throughput and/or to improve reliability.

At 616, after receiving the DL data through PDSCH (e.g., the PDSCH 612) and transmitting PUCCH and PUSCH (e.g., the PUCCH 614) using beam A, the UE 602 may monitor the channel for additional DCIs or for additional PDCCH for an interval of time configured by an inactivity timer. When the inactivity timer expires without the UE 602 detecting any additional DCI, the UE 602 may deactivate beam A and may enter the sleep mode.

At 618, the UE 602 may wake up from the sleep mode during the on duration of the next DRX cycle to search for a DCI from the base station 604 using a subset of beams, such as single beam A. In some examples, the UE 602 may determine that another beam is the beam with the strongest signal strength received from the base station 604 based on the beam measurements carried out using the CSI-RS during 606. The UE 602 may search for the DCI using the other beam determined to have the strongest beam strength.

The base station 604 may transmit the PDCCH with DCI 620 to configure the UE 602 for PDSCH and PUCCH. The DCI may include a command to configure the UE 602 with one or more additional antenna ports/beams based on the reported beam measurements or the request for additional beams in the PUCCH 614 received by the base station 604 from the UE 602. In some examples, the base station 604 may autonomously determine that additional beams may be desirable to increase throughput and/or to improve reliability. In some examples, the base station 604 may issue a command using a MAC control element to configure the UE 602 with one or more additional beams. In some examples, the base station 604 may issue a command using RRC signaling to configure the UE 602 with one or more additional beams. In some examples, while the UE 602 is searching for a wake up signal after the UE 602 wakes up from the sleep mode, the base station 604 may use one or more bits in a payload of the wake up signal to command the UE 602 to activate one or more additional beams. For example, the UE 602 may receive the wake up signal and may determine whether the wake up signal corresponds to the UE 602, such as whether the one or more bits match an identifier associated with the UE 602. In one aspect, the base station 604 may configure the UE 602 with one or more control resource sets (CORESET) or search space corresponding to the one or more additional links for the UE 602 to search for the DCI or a control message based on the CORESET or the search space. For example, different CORESETs or search spaces may be associated with different beams and/or antenna ports so that when a specific beam or antenna port is inactive (or deactivated), the UE 602 may not monitor the corresponding CORESET or search space.

Upon receiving the command (or an indicator) to increase one or more additional beams from the base station 604, the UE 602 may activate one or more additional beams for DL and UL communication. For example, the UE 602 may activate beam B in addition to beam A for receiving the PDSCH and/or transmitting the PUCCH and/or the PUSCH. The UE 602 may activate beam B from the same antenna panel as beam A (e.g., as shown in scenario 420 of FIG. 4B), or may activate beam B using a different antenna panel (e.g., as shown in scenario 440 of FIG. 4C). In one aspect, the UE 602 may determine which beam to activate based on the beam measurements and/or by performing a tradeoff between the performance gain and the power consumption achieved by activating different beams.

The base station 604 may transmit DL data on PDSCH 622. The UE 602 may receive the PDSCH 622 using beam A and beam B. The UE 602 may use the beam A and beam B for spatial multiplexing to increase throughput and/or for diversity combining to increase reliability. The UE 602 may then transmit the PUCCH 624 using beam A and beam B. In some examples, the PUCCH 624 may include HARQ-ACK/NACK. The UE 602 may also transmit the PUSCH using beam A and beam B.

At 626, after receiving the DL data through PDSCH and transmitting PUCCH and PUSCH using beam A and beam B, the UE 602 may monitor the channel for additional DCIs and/or for additional PDCCH for an interval of time configured by the inactivity timer. In some examples, when the inactivity timer expires without the UE 602 detecting any additional DCI (or any additional PDCCH), the UE 602 may deactivate beam A and beam B and may enter the sleep mode.

At 628, the UE 602 may wake up from the sleep mode during the on duration of the next DRX cycle to search for a DCI from the base station 604 using a single beam, beam A. In one aspect, the UE 602 may use beam A and beam B (e.g., the two beams that were last activated before the sleep mode) for performing the search. For example, the UE 602 may use multiple beams to speed up the search or because the signaling environment for the channel has become more challenging since the last communication with the base station 604.

Figure 7:
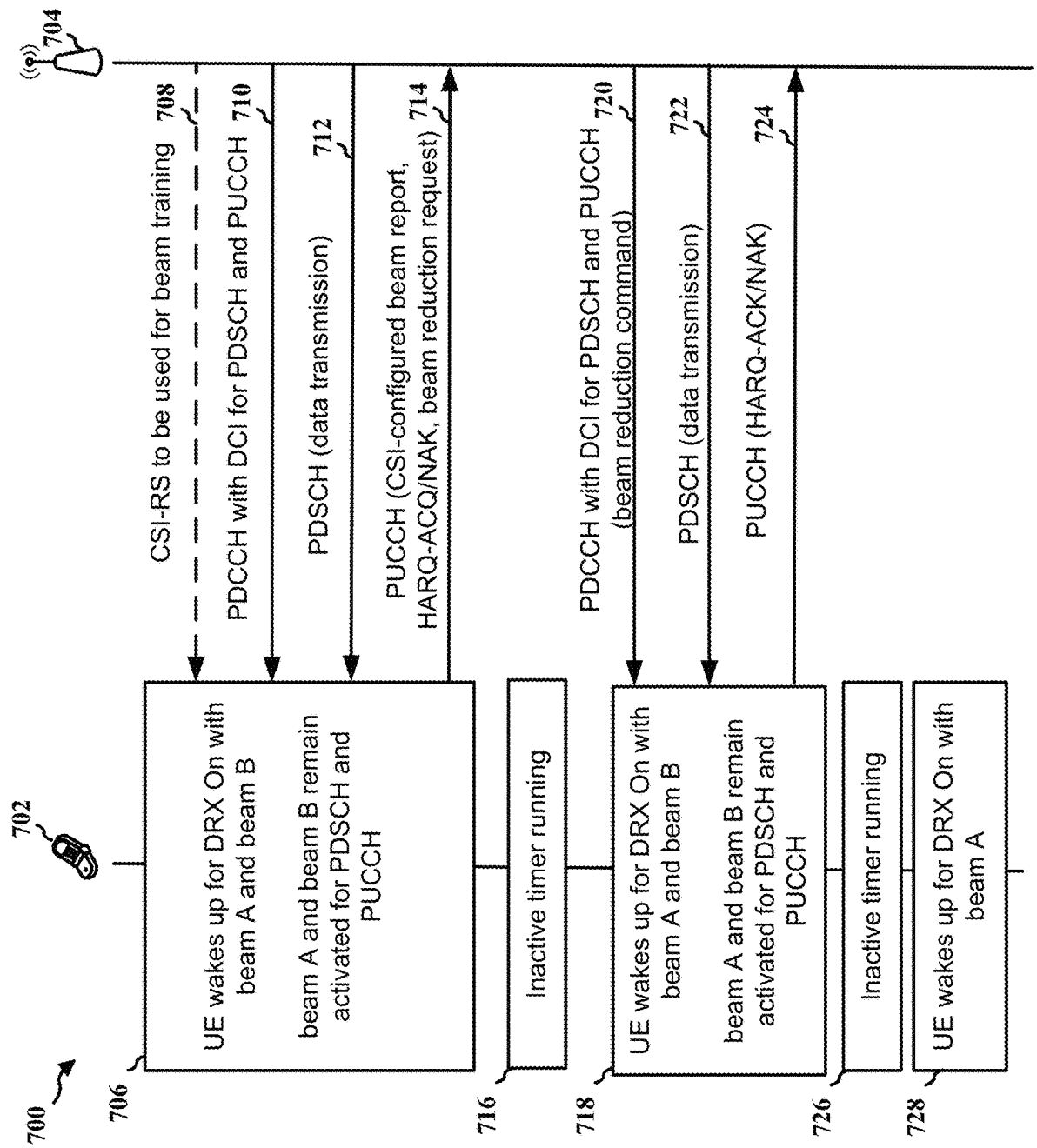
FIG. 7 is a call flow diagram illustrating an implementation of a UE exchanging messages with a base station to decrease the number of beams used for data communication during the DRX cycle, in accordance with certain aspects of the disclosure.

FIG. 7 is a call flow diagram 700 illustrating an implementation of a UE 702 exchanging messages with a base station 704 to decrease the number of beams used for data communication during the DRX cycle, in accordance with certain aspects of the disclosure. One or more aspects of the UE 702 may be implemented by the UE 104 of FIG. 1, the UE 350 of FIG. 3, and/or the UE 602 of FIG. 6. One or more aspects of the base station 704 may be implemented by the base station 180 of FIG. 1, the base station 310 of FIG. 3, and/or the base station 604 of FIG. 6.

It should be appreciated that while the wireless communication in diagram 700 includes one base station 704 in communication with one UE 702, in additional or alternative examples, the base station 704 may be in communication with any suitable quantity of UEs and/or other base stations, and/or the UE 702 may be in communication with any suitable quantity of base stations and/or other UEs. Thus, while certain of the transmissions between the base station 704 and the UE 702 are described as uplink transmissions and downlink transmissions, in other examples, any of the transmissions may additionally or alternatively be sidelink transmissions.

In the illustrated example, the UE 702 and the base station 704 are in communication. Furthermore, the UE 702 is initially operating in a DRX mode (e.g., in a sleep mode of the DRX cycle).

At 706, the UE 702 may wake up from the sleep mode during the on duration of the DRX cycle to search for a control message from the base station 704 using beam A and beam B. In some examples, the UE 702 may determine beam A and beam B to be the two beams with the strongest received signal strength from the base station 704 during a beam monitoring period of a previous DRX cycle during which the UE 702 measures the received signal strengths of multiple beams from the base station 704. In some examples, beam A and beam B may be the two beams that were last activated before the UE 702 went into the sleep mode. The UE may monitor for a WUS prior to monitoring for the control message. Thus, the UE may activate additional antenna ports/beams upon detecting the WUS in order to monitor for the control message.

The base station 704 may initiate the beam monitoring period for the current DRX cycle by transmitting the channel state information reference signals (CSI-RS) 708 (e.g., similar to the transmitting of CSI-RS 608 of FIG. 6). The UE 702 may activate a series of beams to measure the signal strength of the CSI-RS 708 received by beam A and beam B. In some examples, the UE 702 may measure the signal strength of the CSI-RS 708 received by additional beams. The UE 702 may store the received signal strengths of the one or more beams. After the beam measurement is completed, the UE 702 may activate beam A and beam B to search for the DCI from the base station 704 during the on duration.

The base station 704 may transmit the PDCCH 710 with DCI to configure the UE 702 for PDSCH and PUCCH. In some examples, if the UE 702 detects the DCI using beam A and beam B, the UE 702 may keep beam A and beam B activated for the DL and UL communication. In some examples, if the UE 702 does not detect the DCI using beam A and beam B, the UE 702 may continue to monitor the channel for the DCI or the PDCCH for the on duration of the DRX cycle. in some examples, when the on duration concludes without the UE 702 detecting the DCI, the UE 702 may deactivate beam A and beam B and may enter the sleep mode.

The base station 704 may transmit DL data on PDSCH 712. The UE 702 may receive the PDSCH 712 using beam A and beam B. The UE 702 may then transmit the PUCCH 714 using beam A and beam B. The PUCCH 714 may include the beam measurements carried out using the CSI-RS 708, and the HARQ-ACK/NACK for the DL data received on the PDSCH 712. The UE 702 may also transmit a request for an adjustment to the number of beams to be used by the UE 702, e.g., for DRX operation, based on the beam measurements. For example, the UE 702 may request a fewer number of beams if the beam measurements indicate that beam B may not have sufficient received signal strengths to support communication of a desired QoS. The base station 704 may receive the beam measurements reported by the UE 702 and the number of beams requested by the UE 702 and may determine the number of beams to configure the UE 702, e.g., for monitoring for communication during DRX. For example, if the reported beam measurements indicate that sufficient signal strength was not received on beam B or if the UE 702 requests a fewer number of beams, the base station 704 may configure the UE 702 to decrease the number of beams that it uses for monitor for a WUS and/or control message during DRX.

At 716, after receiving the DL data through PDSCH 712 and transmitting PUCCH 714 (and PUSCH) using beam A and beam B, the UE 702 may monitor the channel for additional DCIs and/or for additional PDCCH for an interval of time configured by an inactivity timer. In some examples, when the inactivity timer expires without the UE 702 detecting any additional DCI (or any additional PDCCH), the UE 702 may deactivate beam A and beam B and may enter the sleep mode.

At 718, the UE 702 may wake up from the sleep mode during the on duration of the next DRX cycle to search for a DCI from the base station 704 using beam A and beam B.

For example, the base station 704 may transmit the PDCCH 720 with DCI to configure the UE 702 for PDSCH and PUCCH. In some examples, the DCI may include a command to configure the UE 702 with one or more fewer beams based on the reported beam measurements or the request for a fewer number of beams in the PUCCH 714 received by the base station 704 from the UE 702. In some examples, the base station 704 may autonomously determine (e.g., without receiving reported beam measurements and/or a request for a fewer number of beams) that one or more fewer beams may be desirable to save power without affecting throughput and/or reliability. In some examples, the base station 704 may issue a command using a MAC control element to configure the UE 702 with one or more fewer beams. In some examples, the base station 704 may issue a command using RRC signaling to configure the UE 702 with one or more fewer beams. In some examples, while the UE 702 is searching for a wake up signal after the UE 702 wakes up from the sleep mode, the base station 704 may use one or more bits in a payload of the wake up signal to command the UE 702 to decrease the number of beams.

Upon receiving the command to decrease the number of beams, the UE 702 may deactivate one or more beams for the on duration of the next DRX cycle to search for the DCI from the base station 704. In some examples, the UE 702 may maintain beam A and beam B for DL and UL communication for the current DRX cycle. In some examples, the UE 702 may deactivate one or more beams for the DL and UL communication for the current DRX cycle. In some examples, the UE 702 may determine which beam to deactivate based on the beam measurements to maintain the strongest beam.

The base station 704 may transmit DL data on PDSCH 722. The UE 702 may receive the PDSCH 722 using beam A and beam B. In some examples, if the UE 702 deactivates beam B for the current DRX cycle, the UE 702 may receive the PDSCH using only beam A. The UE 702 may then transmit the PUCCH 724 using beam A and beam B. The UE 702 may also transmit the PUSCH using beam A and beam B. In some examples, if the UE 702 deactivates beam B for the current DRX cycle, the UE 702 may transmit the PUCCH 724 (and PUSCH) using beam A.

At 726, the UE 702 may monitor the channel for additional DCIs or for additional PDCCH for the interval of time configured by the inactivity timer. In some examples, when the inactivity timer expires without the UE 702 detecting any additional DCI, the UE 702 may deactivate beam A and beam B and may enter the sleep mode.

At 728, UE 702 may wake up from the sleep mode during the on duration of the next DRX cycle to search for a DCI from the base station 604 using the reduced number of beams indicated by the PDCCH 720 (e.g., using a single beam such as beam A).

Figure 8:
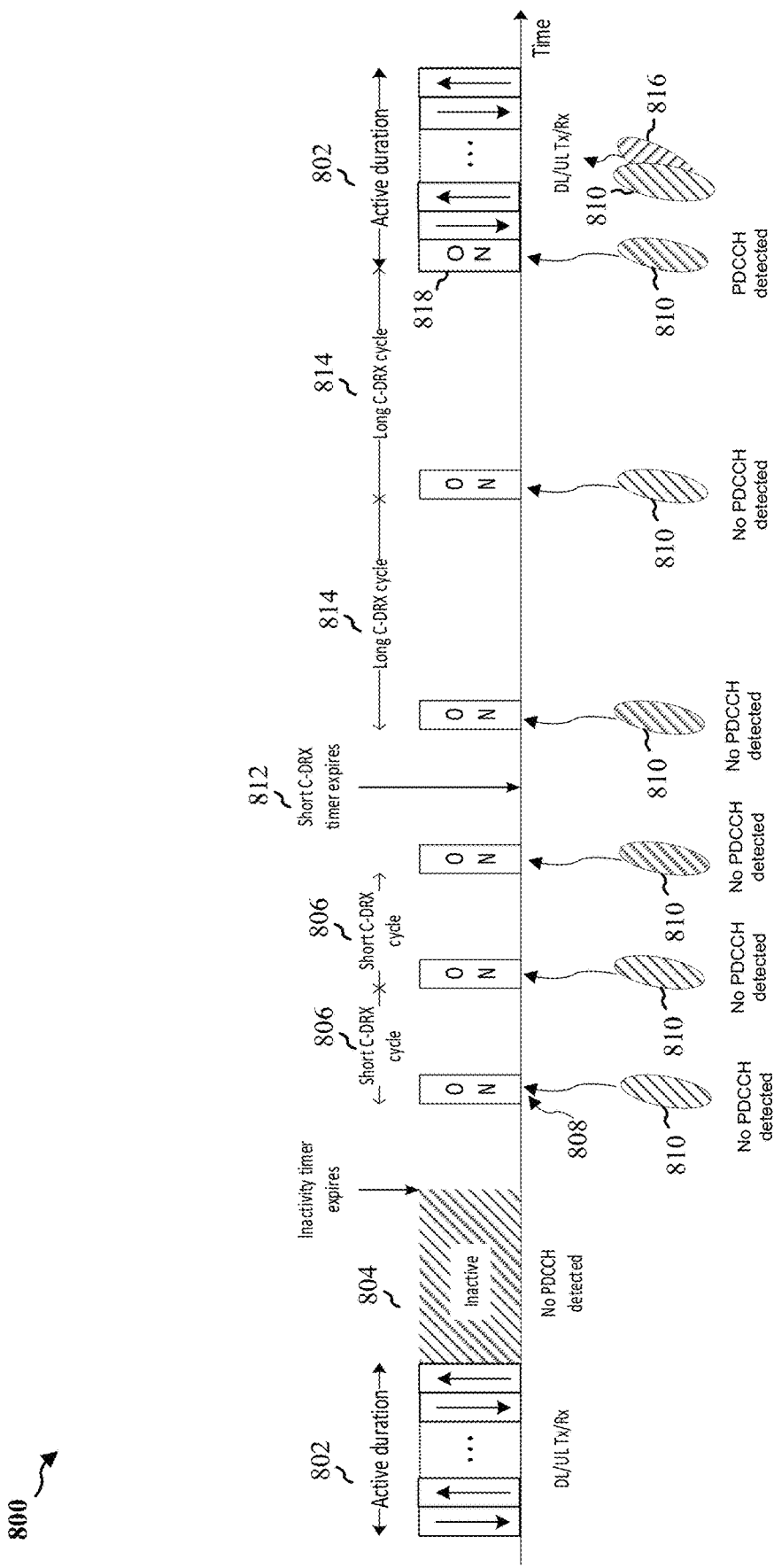
FIG. 8 is a diagram illustrating a timeline for a UE to activate a subset of beams during the on duration of the DRX cycles and to activate additional beams for data communication if a control signal is received during the on duration, in accordance with certain aspects of the disclosure.

FIG. 8 is a diagram illustrating a timeline 800 for a UE to activate a subset of beams during the on duration of the DRX cycles and to activate additional beams for data communication if a control signal (e.g., a grant for a DL or UL transmission) is received during the on duration in accordance with certain aspects of the disclosure. The UE may be the UE 104, the UE 350, the UE 602, and/or the UE 702.

At 802, during the active duration of the DRX cycle, the UE may communicate with a base station or with another UE using one or more beams. For example, the UE may receive DL data on PDSCH and may transmit PUCCH and UL data on PUSCH. At the end of the DL/UL communication, the UE may start an inactivity timer. The inactivity timer may be configured with a time interval during which the UE may monitor for communication from the base station, e.g., a control message or a PDCCH.

At 804, the UE may monitor the communication channel for a control message such as DCI or PDCCH for the time interval configured by the inactivity timer. When the inactivity timer expires without the UE detecting a DCI or PDCCH, the UE may deactivate the beams (including corresponding antenna ports, antenna arrays, or antenna elements) and may enter the sleep mode. During the sleep mode, the UE may not be expected to transmit or receive any signals. The UE may wake up at a periodic interval configured by a short DRX cycle 806 to search for the DCI or PDCCH. The brief periodic interval during which the UE may wake up to search for the DCI or PDCCH may be referred to as an on duration 808. The UE may activate a subset of antenna ports (e.g., a single antenna port/antenna panel to use a subset of beams during the on duration 808) to search for a WUS and/or PDCCH. In some examples, the UE may activate a single beam 810 during the on duration 808. Thus, the number of antenna port(s)/beam(s) used by the UE to monitor for a WUS or control message may be fewer than the number of antenna ports/beams used by the UE during the active duration 802.

If the UE does not detect the WUS or the PDCCH during the on duration 808, the UE may deactivate beam 810 and may go back to the sleep mode until the next occurrence of the on duration 808. In one aspect, if the UE fails to detect a WUS or PDCCH after a number of the short DRX cycles 806 (e.g., after a short DRX timer expires at 812), the UE may wait for a longer period of time before it wake up again from the sleep mode to search for the WUS or PDCCH so as to reduce power. For example, the UE may wake up at a longer periodic interval configured by a long DRX cycle 814 that is longer than the short DRX cycle 806.

If the UE detects the WUS and/or the PDCCH during an on duration (e.g., an on duration 818) the UE may activate additional beams for DL and UL communication with the base station. For example, the UE may activate at least one additional antenna port/at least one additional beam 816 in addition to the beam 810 in order to monitor for further communication from the base station, such as a control message following the WUS and/or data following a control message. In some examples, the UE may determine the number of additional antenna port(s)/beam(s) to activate based on the measurements of signal strength received on beams during a beam monitoring period. In some examples, the UE may receive a command from the base station to increase the number of antenna ports/beams based on beam measurements reported from the UE to the base station. In some examples, the command may be received in a WUS. In some examples, the command may be received in response to a request from the UE to adjust the number of antenna ports/beams.

Figure 9:
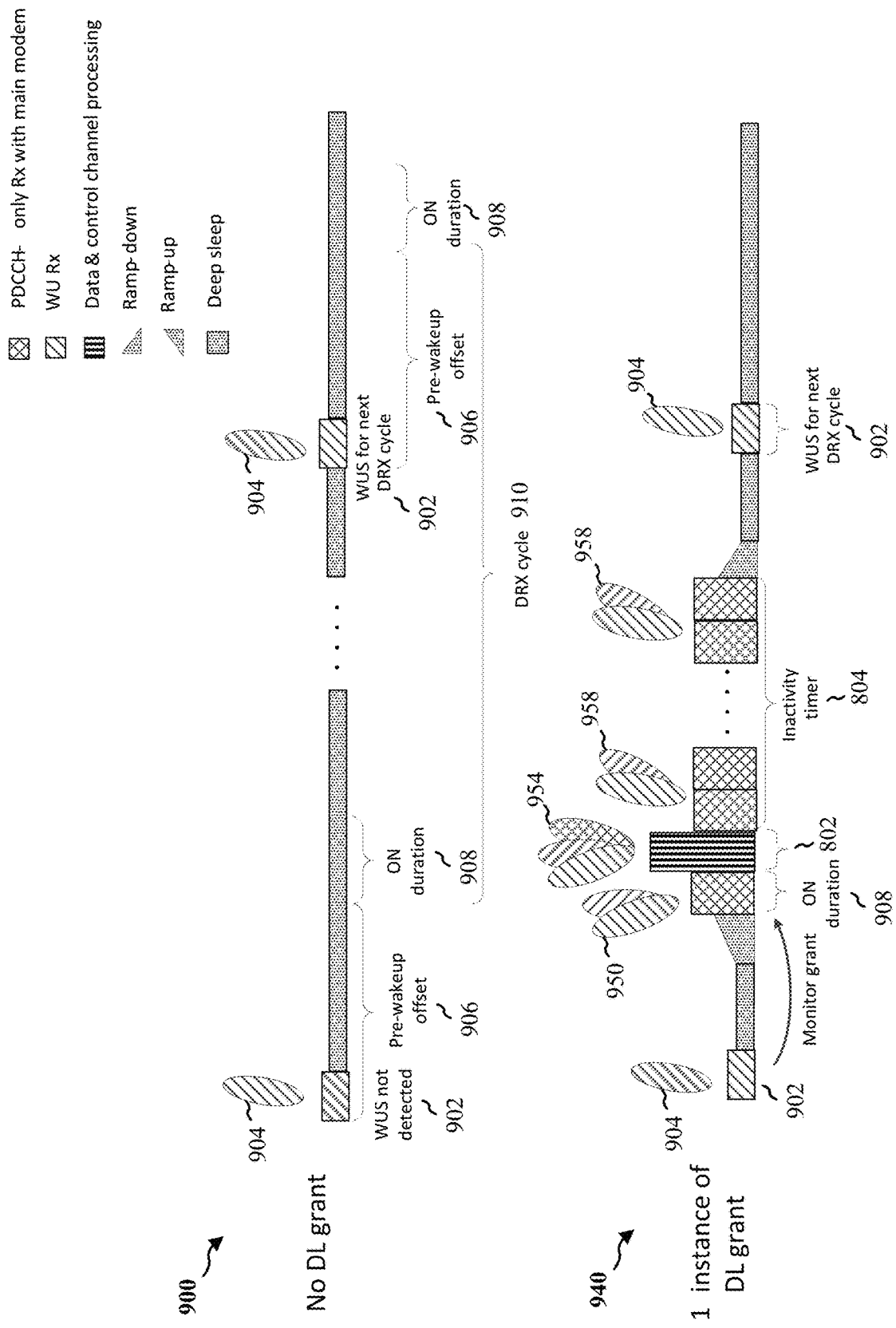
FIG. 9 is a diagram illustrating a timeline for a UE to activate a subset of beams to search for a wake up signal before the on duration of the DRX cycle, to activate additional beams during the on duration of the DRX cycles to search for a control signal when the wake up signal is detected, and to activate even more beams for data communication if the control signal is received during the on duration, in accordance with certain aspects of the disclosure.

FIG. 9 is a diagram illustrating timeline 900, 940 for a UE to activate a subset of beams to search for a WUS, e.g., before the on duration of the DRX cycle. The WUS may also be referred to herein as a pre-wake up signal. The UE may use a reduced number of antenna port(s)/beam(s) to monitor for the WUS and may activate additional beams during the on duration of the DRX cycles to search for a control signal when the WUS is detected. The UE may activate one or more additional antenna port(s)/beam(s) for data communication if the control signal is received during the on duration in accordance with certain aspects of the disclosure.

In FIG. 9, in an extended sleep mode, the UE may periodically turn on a low-power wake-up subsystem to search for a pre-wake up signal using the strongest beam or a subset of the strongest beams at a time offset before the periodic on duration of the DRX cycles. In some examples, the low-power wake-up system may be a low complexity receiver, e.g., a simple correlator, that consumes less power than activating a beam to decode the PDCCH during the on duration of the DRX cycle. In some examples, the wake up signal may be a signal waveform with a high immunity to interference, such as a modulated tone based on on-off-keying (OOK), a preamble, or a reference signal. In some examples, if the UE does not detect the pre-wake up signal, the UE may deactivate all beams to reenter the sleep mode. In some examples, if the UE detects the pre-wake up signal, the UE may activate one or more additional antenna ports/beams to search for a control message such as the DCI from the network during the on duration. The control message may be used by the network to configure the number of links used by the UE for full data communication. In some examples, if the UE detects the control message during the on duration, the UE may activate additional beams to use the number of beams as configured by the control message for transmitting and receiving data. In some examples, if the UE does not detect the control message during the on duration, the UE may wait for a period of data inactivity before deactivating all the beams and may reenter the sleep mode. Searching for the pre-wake up signal using the low-power wake-up subsystem may consume less power than activating the UE to search for the control message during the on duration. It may also allow for a gradual ramp-up of the activation of the additional antenna ports/beams to enable data communication.

In the timeline in diagram 900, the UE periodically wakes up during the wake up interval 902 that is time offset by a pre-wakeup offset 906 from the on duration 908 of the DRX cycle 910. It should be appreciated that the on duration 908 may correspond to the on duration 808 of FIG. 8. The UE may turn on the low-power wake-up subsystem to search for a pre-wake up signal using the beam 904. In some examples, the beam 904 may be determined as the beam with the strongest received signal strength measured a beam monitoring period. In some examples, if the UE does not detect the pre-wake up signal using the beam 904, the UE may skip the on duration of the current DRX cycle and may go back to sleep until the next DRX cycle. Timeline 900 shows a scenario where there is no DL grant from the base station.

The timeline in diagram 940 shows a scenario where there is a DL grant from the base station. The UE may detect the pre-wake up signal using the beam 904 during the wake up interval 902. The UE may activate an additional beam to use multiple beams 950 to search for the DCI from the base station during the on duration 908. The UE may ramp up the activation of the additional beam and the powering up of the control and processing components used to search for the DCI. In some examples, if the UE detects the DCI during the on duration 908, the UE may activate additional beams for DL and UL communication with the base station. For example, the UE may activate one or more additional beams (e.g., three beams) to use beams 954 to communicate with the base station during the active duration 942. It should be appreciated that the active duration 942 may correspond to the active duration 802 of FIG. 8. In some examples, the UE may determine the number of additional beams to activate based on the measurements of signal strength received on beams during a beam monitoring period. In some examples, the UE may receive a command from the base station to increase the number of beams based on beam measurements reported from the UE to the base station.

At the end of the active duration 942, the UE may deactivate a beam to revert back to using the two beams 958 for searching for the DCI. The UE may also start an inactivity timer. In some examples, the inactivity timer may be configured with a time interval during which the UE may monitor for a DCI. The UE may monitor the communication channel for the DCI or PDCCH for the time interval configured by the inactivity timer. In some examples, when the inactivity timer expires without the UE detecting a DCI or PDCCH, the UE may deactivate all the beams and may enter the sleep mode. In some examples, the UE may deactivate the beams and power down the control and processing components used to search for the DCI during a ramp-down period. During the sleep mode, the UE may not be expected to transmit or receive any signals. The UE may wake up at the next wake up interval 902 to detect the pre-wake up signal using the beam 904.

Figure 10:
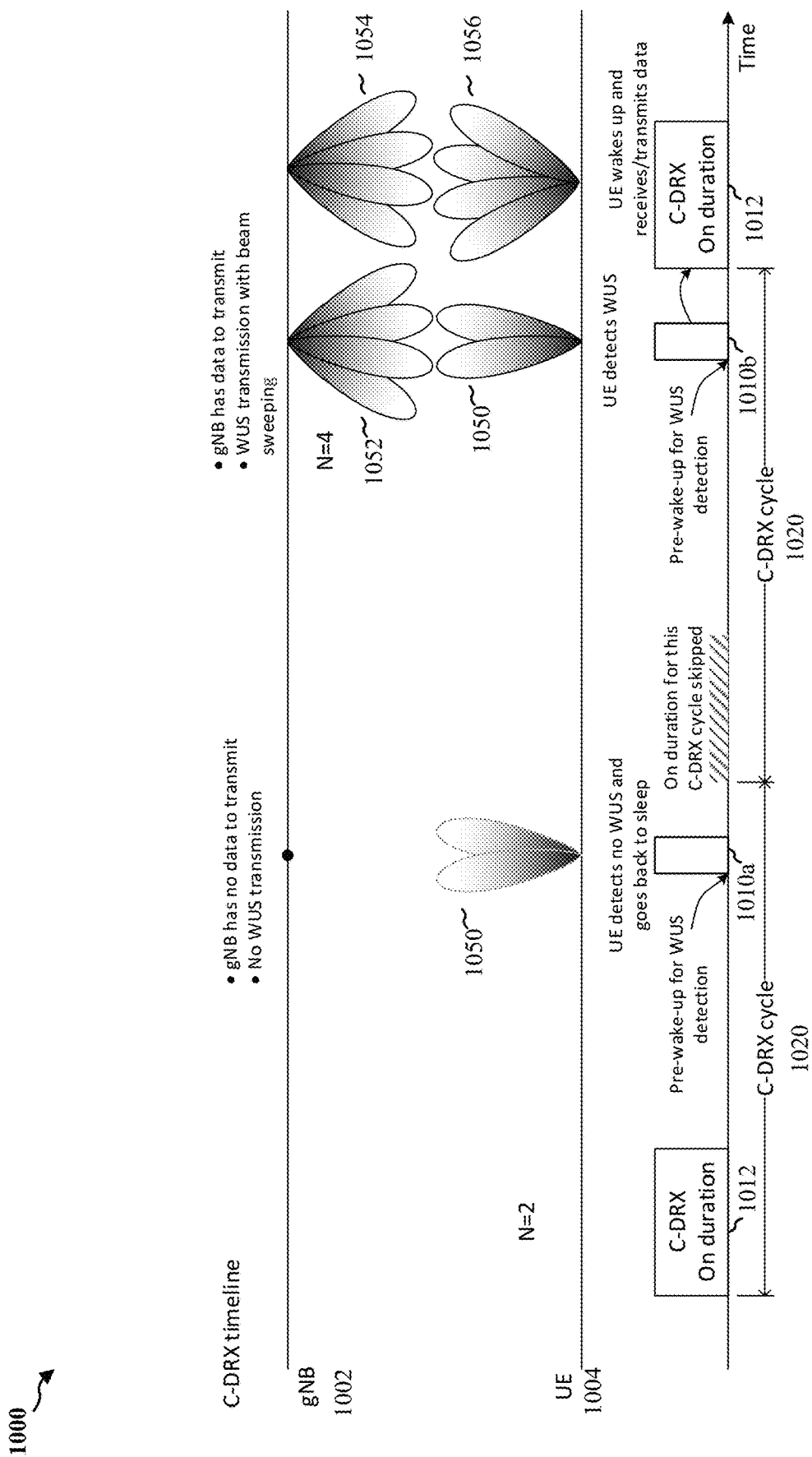
FIG. 10 is a diagram illustrating a timeline for a UE and a base station to communicate by activating a subset of beams during the on duration of the DRX cycles and to activate additional beams for data communication if a control signal is received during the on duration, in accordance with certain aspects of the disclosure.

FIG. 10 is a diagram illustrating a timeline 1000 for a UE 1004 and a base station 1002 to communicate by activating a subset of beams during the on duration of the DRX cycles and to activate additional beams for data communication if a control signal is received during the on duration in accordance with certain aspects of the disclosure. One or more aspects of the UE 1004 may be implemented by the UE 104 of FIG. 1, the UE 350 of FIG. 3, the UE 602 of FIG. 6, and/or the UE 702 of FIG. 7. One or more aspects of the base station 1002 may be implemented by the base station 180 of FIG. 1, the base station 310 of FIG. 3, the base station 604 of FIG. 6 and/or the base station 704 of FIG. 7.

In the illustrated example, the base station 1002 does not transmit a wake up signal during a first wake up interval 1010a. During this time, the UE may wake up from the sleep mode and may turn on the low-power wake-up subsystem to search for a pre-wake up signal using the two beams 1050. In the illustrated example, the UE does not detect the wake up signal during the first wake up interval 1010a and may skip the on duration of the current DRX cycle and may go back to sleep until a next wake up interval 1010b.

The base station 1002 may activate four beams 1052 in a sweeping pattern to transmit a wake up signal during the second wake up interval 1010b. The UE may detect the wake up signal using a subset of beams 1050 (e.g., two beams) during the second wake up interval 1010b. The UE may activate additional beams to use the additional beams 1056 (e.g., four beams) to search for the DCI during an on duration 1012 and may transmit UL and receive DL data using the four beams 1056 if the DCI is detected. The base station may activate additional beams 1054 during the on duration 1012 to communicate with the UE. In some examples, the number of beams configured for the UE during the on duration 1012 may be determined by the base station as a function of the link quality, the mobility of the UE, the capability of the UE, and/or the DRX cycle length 1020.

Figure 11:
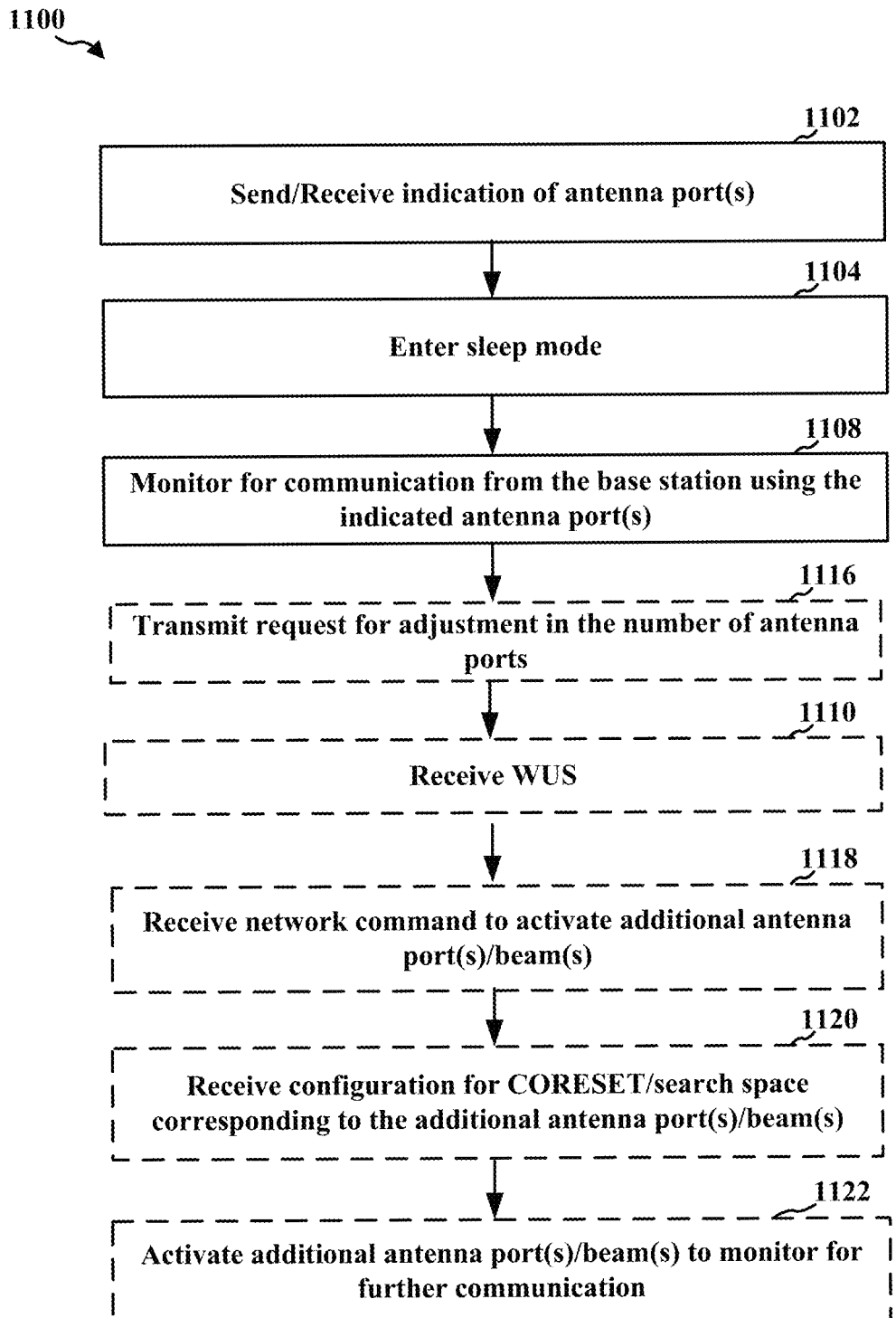
FIG. 11 is a flowchart of a method for a UE to activate links during the DRX cycles, in accordance with certain aspects of the disclosure.

FIG. 11 is a flowchart 1100 of a method of wireless communication. The method may be performed by a UE or a component of a UE (e.g., the UE 104, the UE 350, the UE 602, the UE 702, the UE 1004, and/or the UE 1550, the apparatus 1202/1202'; the processing system 1314, which may include the memory 360 and which may be the entire UE 350 or a component of the UE 350, such as the TX processor 368, the RX processor 356, and/or the controller/processor 359) having two or more antenna ports. Optional aspects are illustrated with a dashed line. The method provides for greater efficiency in performing DRX by a UE having two or more antenna panels/antenna arrays and enables improved power savings and the flexibility to activate a sufficient number of links without sacrificing link performance during DRX operation.

At 1102, the UE sends or receives an indication from a base station of at least one antenna port. For the example, the UE may include an indication component 1208 configured to facilitate the sending or receiving of an indication of at least one antenna port.

In some examples, the indication may be based on information received from the UE, such as a CSI report, as described in connection with FIGS. 6 and 7. In some examples, the indication to/from the base station may indicate a subset of antenna ports, even a single antenna port, for the UE to use in connection with DRX. In some examples, the indication of the at least one antenna port may comprise an indication of a set of antennas or antenna arrays and corresponding beams to be used for communication between the UE and the base station, an indication of a beam to be used for communication between the UE and the base station, and/or a number of corresponding beams to be used for communication between the UE and the base station. In some examples, the indication of the at least one antenna port may comprise a beam addition request sent by the UE. In some examples, the indication of the at least one antenna port may comprise a beam addition command received from the base station. In some examples, the indication of the at least one antenna port may comprise a beam reduction request sent by the UE. In some examples, the indication of the at least one antenna port may comprise a beam reduction command received from the base station.

In some examples, the UE may indicate antenna port(s) in a beam reduction request, e.g., at 1116. In some such examples, the base station may respond with an indication of antenna port(s), at 1102, with a beam reduction command. Thus, it should be appreciated that the aspects illustrated in FIG. 11 may be performed in a different order than illustrated.

At 1104, the UE enters a sleep mode as part of a DRX cycle. The sleep mode may comprise a low power mode in which the UE does not monitor for communication from the base station. For example, the UE may include a DRX component 1210 configured to facilitate entering a sleep mode as part of a DRX cycle. In some examples, the UE may deactivate one or more antenna panels, antenna arrays, etc. when entering the sleep mode. Thus, entering a sleep mode of the DRX cycle may comprise deactivating one or more antennas or antenna arrays of the UE.

At 1108, the UE monitors for communication from the base station during the DRX cycle using the at least one antenna port(s) indicated at 1102. For example, the UE may include a monitor component 1214 configured to facilitate monitoring for communication from the base station during the DRX cycle using the at least one antenna port(s). In some examples, monitoring for communication may comprise activating a first set of antennas or antenna arrays of the UE, and where the first set of antennas or antennary arrays may correspond to the at least one antenna port. In some examples, a second set of antennas or antenna arrays may remain deactivated during the monitoring, and where the second set of antennas or antenna arrays may not correspond to the at least one antenna port. Thus, it should be appreciated that the UE may monitor for communication from the base station using a subset of antenna ports (e.g., even a single antenna port), rather than powering (or activating) all antenna panels and maintaining all links during DRX operation. Instead, the UE may be woken up from the sleep mode using the subset of antenna ports. In some examples, the UE may monitor for the communication from the base station on at least one beam. For example, the UE may monitor for the communication from the base station on a strongest beam corresponding to the at least one antenna port(s). In some examples, the UE may activate one or more additional antenna port(s)/beam(s) based on detecting communication from the base station using the subset of antenna ports.

For example, the UE may monitor, at 1108, for a control channel from the base station. Then, at 1114, the UE may activate additional antenna port(s) or additional beam(s) if control information for the UE is detected from the base station. In some such examples, the UE may not necessarily add a beam merely upon detecting the control channel, but may activate the beam if the control channel is scheduling a downlink grant for the UE, or that the UE anticipates receiving additional communication from the base station. In some examples, the additional antenna port(s) or additional beam(s) may be activated to receive data from the base station. Thus, it should be appreciated that the UE may receive data using the additional antenna port(s) or additional beam(s).

As another example, the UE may monitor, at 1108, for a WUS from the base station. In some such examples, if the UE receives a WUS for the UE, at 1110, the UE may activate one or more additional antenna port(s) or additional beam (s), at 1122. For example, the UE may include an activation component 1212 configured to facilitate activating one or more additional antenna port(s)/additional beam(s) based on detecting communication (e.g., WUS, control channel, network command, etc.) from the base station. In some examples, the additional antenna port(s) or additional beam (s) may be activated, at 1122, to monitor for a control channel from the base station. In some examples, the activation of the one or more additional antenna port(s) or additional beam(s) at 1122 may also be based on the additional aspects described in connection with 1116, 1118, and/or 1120.

For example, at 1120, the UE may receive a configuration indicating a CORESET or search space corresponding to additional antenna port(s) or the additional beam(s). For the UE may include a CORESET component 1216 configured to facilitate the receiving of a configuration indicating a CORESET or search space corresponding to the at least one additional antenna port or the at least one additional beam. In some examples, the UE may then monitor, e.g. at 1122, for a control channel based on the configuration for the CORESET of the search space and using the additional antenna port(s)/beam(s). Thus, it should be appreciated that in some examples, the base station may configure or activate CORESET/search space sets whose quasi co-location (QCL) states are related to additional links activated at the UE. For example, QCL Type-D states may be related to antenna port(s)/beam(s).

At 1118, the UE may receive a network command from the base station to activate additional antenna port(s) or the additional beam(s). Then, at 1122, the UE may activate the additional antenna port(s) or the additional beam(s) in response to the network command. Thus, it should be appreciated that in some examples, the network command may be received using the subset of antenna ports/subset of beams that are activated at 1106. In some examples, the network command may be comprised in DCI, a MAC-CE, or via RRC signaling. In some examples, the network command may be comprised in a WUS, e.g., received at 1110. In some such examples, the WUS may include one or more bits that indicate additional links to be activated for the reception of the control channel and/or data.

In some examples, the UE may also request an adjustment (e.g., either an increase or decrease) in the number of antenna port(s)/beam(s). Thus, at 1116, the UE may transmit a request for an adjustment in a number of antenna ports or beams to the base station prior to receiving the network command at 1118. In some examples, the network command may be received in response to the request transmitted at 1116.

In some examples, the UE may be ready to receive a higher throughput or higher rank transmission by activating the additional links, e.g., additional antenna port(s)/additional beam(s), while achieving additional power savings during DRX operation by activating a subset of antenna ports to monitor for initial communication while in DRX (e.g., less than the total number of antenna ports available to the UE). In some examples, for higher reliability, diversity combining may be achieved through the use of multiple links based on the activation of additional antenna port(s)/ additional beam(s).

Figure 12:
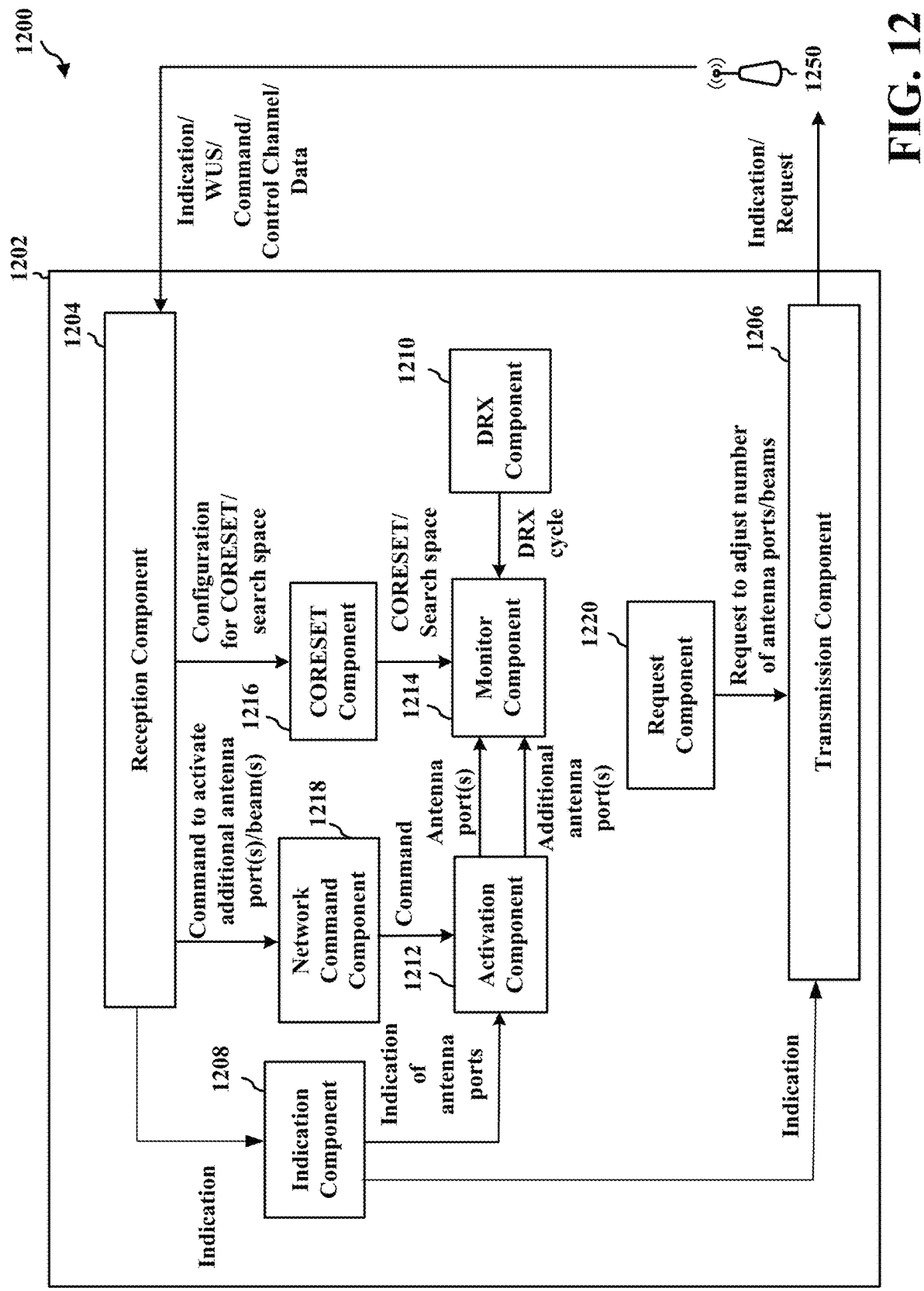
FIG. 12 is a conceptual data flow diagram illustrating the data flow between different means/components in an example apparatus of a UE, in accordance with certain aspects of the disclosure.

FIG. 12 is a conceptual data flow diagram 1200 illustrating the data flow between different means/components in an example apparatus 1202. The apparatus may be a UE (e.g., the UE 104, the UE 350, the UE 602, the UE 702, the UE 1004, and/or the UE 1550). The apparatus 1202 includes a reception component 1204, a transmission component 1206, an indication component 1208, a DRX component 1210, an activation component 1212, a monitor component 1214, a CORESET component 1216, a network command component 1218, and a request component 1220.

The apparatus 1202 may include the reception component 1204 that receives downlink communication from a base station 1250 and may include the transmission component 1206 that transmits communication to the base station 1250. The apparatus 1202 may include the indication component 1208 configured to receive an indication from the base station 1250 or to send an indication to the base station 1250 of at least one antenna port (e.g., as described in connection with 1102). The apparatus 1202 may include the DRX component 1210 configured to enter a sleep mode as part of a DRX cycle (e.g., as described in connection with 1104). The apparatus 1202 may include the monitor component 1214 configured to monitor for communication from the base station 1250 during the DRX cycle using the at least one antenna port (e.g., as described in connection with 1108). The apparatus 1202 may include the activation component 1212 configured to activate additional antenna port (s)/additional beam(s) based on detecting communication (e.g., WUS, control channel, network command, etc.) from the base station 1250 (e.g., as described in connection with 1122). The apparatus 1202 may include the CORESET component 1216 configured to receive a configuration indicating a CORESET or search space corresponding to the at least one additional antenna port or the at least one additional beam (e.g., as described in connection with 1120). The apparatus 1202 may include the network command component 1218 configured to receive a network command from the base station 1250 to activate at least one additional antenna port or at least one additional beam (e.g., as described in connection with 1118). The apparatus 1202 may include the request component 1220 configured to transmit a request for an adjustment in a number of antenna ports or beams to the base station prior to receiving the network command (e.g., as described in connection with 1116).

The apparatus may include additional components that perform each of the blocks of the algorithm in the aforementioned flowcharts of FIGS. 6, 7, and/or 11. As such, each block in the aforementioned flowcharts of FIGS. 6, 7, and/or 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
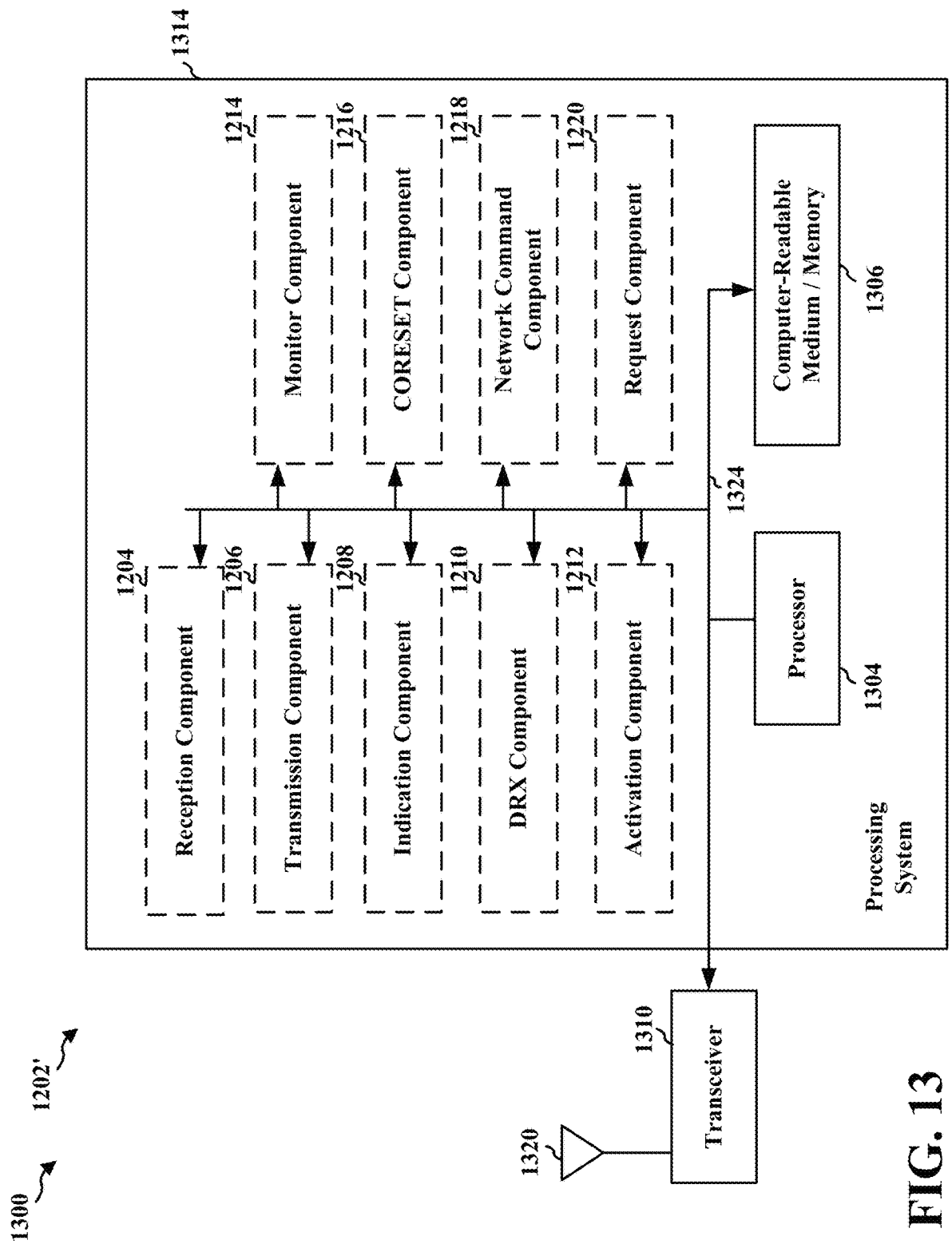
FIG. 13 is a diagram illustrating an example of a hardware implementation for an apparatus of a UE employing a processing system, in accordance with certain aspects of the disclosure.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, 1218, 1220, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216, 1218, 1220. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359. Alternatively, the processing system 1314 may be the entire UE (e.g., see the UE 350 of FIG. 3).

In one configuration, the apparatus 1202/1202' for wireless communication includes means for sending to or receiving from a base station an indication of at least one antenna port. The apparatus may include means for entering a sleep mode as part of a DRX cycle. The apparatus may include means for monitoring for communication from the base station during the DRX cycle using the at least one antenna port. The apparatus may include means for receiving a configuration indicating a CORESET or search space corresponding to the at least one antenna port, and where the UE monitors for the control channel based on the configuration for the CORESET of the search space. The apparatus may include means for deactivating one or more antenna or antenna arrays of the UE. The apparatus may include means for activating a first set of antennas or antenna arrays of the UE, the first set corresponding to the at least one antenna port. The apparatus may include means for sending a beam addition request to activate one or more additional corresponding antennas or antenna arrays. The apparatus may include means for receiving from the base station a beam addition command to activate one or more additional corresponding antennas or antenna arrays. The apparatus may include means for sending a beam reduction request to deactivate one or more corresponding antennas or antenna arrays. The apparatus may include means for receiving from the base station a beam reduction command to deactivate one or more corresponding antennas or antenna arrays. The apparatus may include means for monitoring on a beam corresponding to the at least one antenna port. The apparatus may include means for monitoring using a strongest beam corresponding to the at least one antenna port. The apparatus may include means for monitoring for a control channel from the base station, where the UE activates at least one additional antenna port or at least one additional beam based on the control channel, and where the at least one additional antenna port or the at least one additional beam is activated to receive data from the base station. The apparatus may include means for monitoring for a WUS directed to the UE from the base station, and where the UE activates at least one additional antenna port or at least one additional beam when the WUS directed to the UE is detected from the base station. The apparatus may include means for activating the at least one additional antenna port or the at least one additional beam to monitor for a control channel or a data channel from the base station. The apparatus may include means for receiving a network command from the base station to activate at least one additional antenna port or at least one additional beam, and where the network command is comprised in at least one of DCI, a MAC CE, RRC signaling, or a WUS. The apparatus may include means for activating the at least one additional antenna port or the at least one additional beam in response to the network command. The apparatus may include means for transmitting a request for an adjustment in a number of antenna ports or corresponding beams to the base station prior to receiving the network command.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
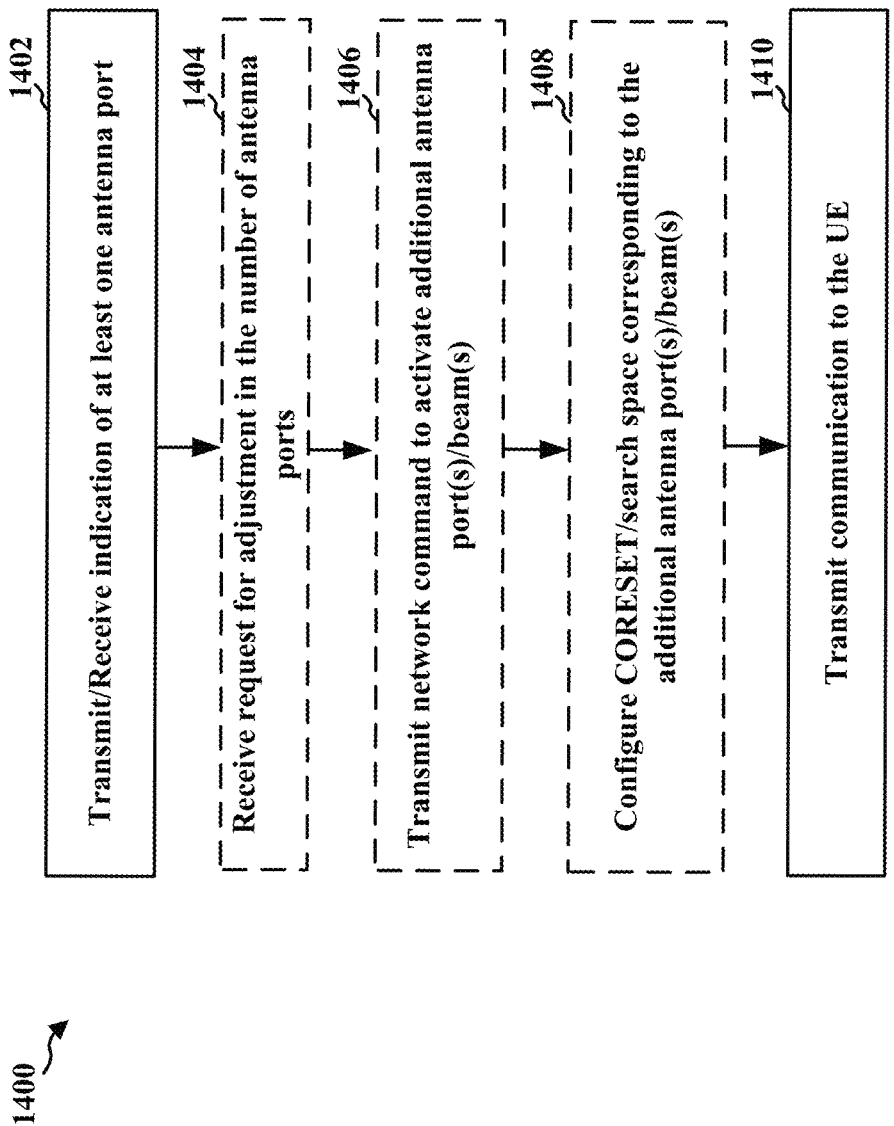
FIG. 14 is a flowchart of a method for a base station to activate links used by a UE during the DRX cycles, in accordance with certain aspects of the disclosure.

FIG. 14 is a flowchart 1400 of a method of wireless communication. The method may be performed by a base station or a component of a base station (e.g., the base station 102, the base station 180, the base station 310, the base station 604, the base station 704, the base station 1002, and/or the base station 1250; the apparatus 1502/1502'; the processing system 1614, which may include the memory 376 and which may be the entire base station 310 or a component of the base station 310, such as the TX processor 316, the RX processor 370, and/or the controller/processor 375). Optional aspects are illustrated with a dashed line. The method provides assistance to a UE, by the base station, to perform DRX with greater efficiency and improves power savings and the flexibility to activate a sufficient number of links without sacrificing link performance during DRX.

At 1402, the base station transmits an indication to a UE or receives an indication from a UE of at least one antenna port at the UE for use in a DRX operation. For example, the base station may include an indication component 1508 configured to transmit an indication to the UE or receive an indication from the UE of at least one antenna port at the UE for use in a DRX cycle.

In some examples, the indication may be based on information received from the UE, such as a CSI report, as described in connection with in FIGS. 6 and 7. In some examples, the indication from the base station may indicate a subset of antenna ports, even a single antenna port, for the UE to use in connection with DRX. In some examples, the indication of the at least one antenna port may comprise an indication of a set of antennas or antenna arrays and corresponding beams to be used for communication between the UE and the base station, an indication of a beam to be used for communication between the UE and the base station, and/or a number of beams to be used for communication between the UE and the base station. In some examples, the indication of the at least one antenna port may comprise a beam addition request received from the UE. In some examples, the indication of the at least one antenna port may comprise a beam addition command sent by the base station. In some examples, the indication of the at least one antenna port may comprise a beam reduction request received from the UE. In some examples, the indication of the at least one antenna port may comprise a beam reduction command sent by the base station.

In some examples, the UE may indicate antenna port(s) in a beam adjustment request, e.g., as illustrated at 1404. In some such examples, the base station may respond with an indication of antenna port(s), as illustrated at 1402, with a beam adjustment command (e.g., to add one or more additional antenna ports or to reduce one or more fewer antenna ports). Thus, it should be appreciated that the aspects illustrated in FIG. 14 may also be performed in a different order than illustrated.

At 1410, the base station transmits communication to the UE according to the DRX cycle based on the at least one antenna port. For example, the base station may include a communication component 1510 configured to facilitate transmitting communication to the UE according to the DRX cycle based on the at least one antenna port. In some examples, the communication may comprise a control channel and/or a WUS. In some examples, the communication may trigger the UE to activate additional antenna port(s)/beam(s) beyond the antenna port(s) indicated to the UE at 1402.

At 1408, the base station may configure the UE with a CORESET or search space corresponding to at least one additional antenna port or at least one additional beam. For example, the base station may include a CORESET component 1514 configured to facilitate configuring the UE with a CORESET or search space corresponding to at least one additional antenna port or at least one additional beam. In some examples, the base station may configure the UE to monitor for a control channel based on the configuration for the CORESET of the search space and using the additional antenna port(s)/beam(s). Thus, it should be appreciated that in some examples, the base station may configure or activate CORESET/search space sets whose QCL states are related to additional links that may be activated at the UE.

At 1406, the base station may transmit a network command from the base station to activate at least one additional antenna port or at least one additional beam. For example, the base station may include a network command component 1512 configured to facilitate transmitting a network command from the base station to activate at least one additional antenna port or at least one additional beam. In some examples, the network command may be comprised in DCI, a MAC-CE, or via RRC signaling. In some examples, the network command may be comprised in a WUS (e.g., as shown at 1110 of FIG. 11). In some examples, the WUS may include one or more bits that indicate additional links to be activated for the reception of the control channel and/or data. Thus, it should be appreciated that the network command may be transmitted for the UE to receive communication using the antenna port(s)/beam(s) that are activated at the UE and may trigger the UE to activate additional antenna port(s)/beam(s) to receive additional communication, such as a control channel or data, from the base station. In some examples, the network command may trigger the UE to deactivate antenna port(s)/beams(s) to receive additional communication, such as a control channel or data, from the base station.

At 1404, the base station may receive a request for an adjustment in a number of antenna ports or beams from the UE, and the network command may be transmitted, at 1406 in response to the request from the UE. For example, the base station may include a request component 1516 configured to facilitate receiving a request for an adjustment in a number of antenna ports or beams from the UE.

Figure 15:
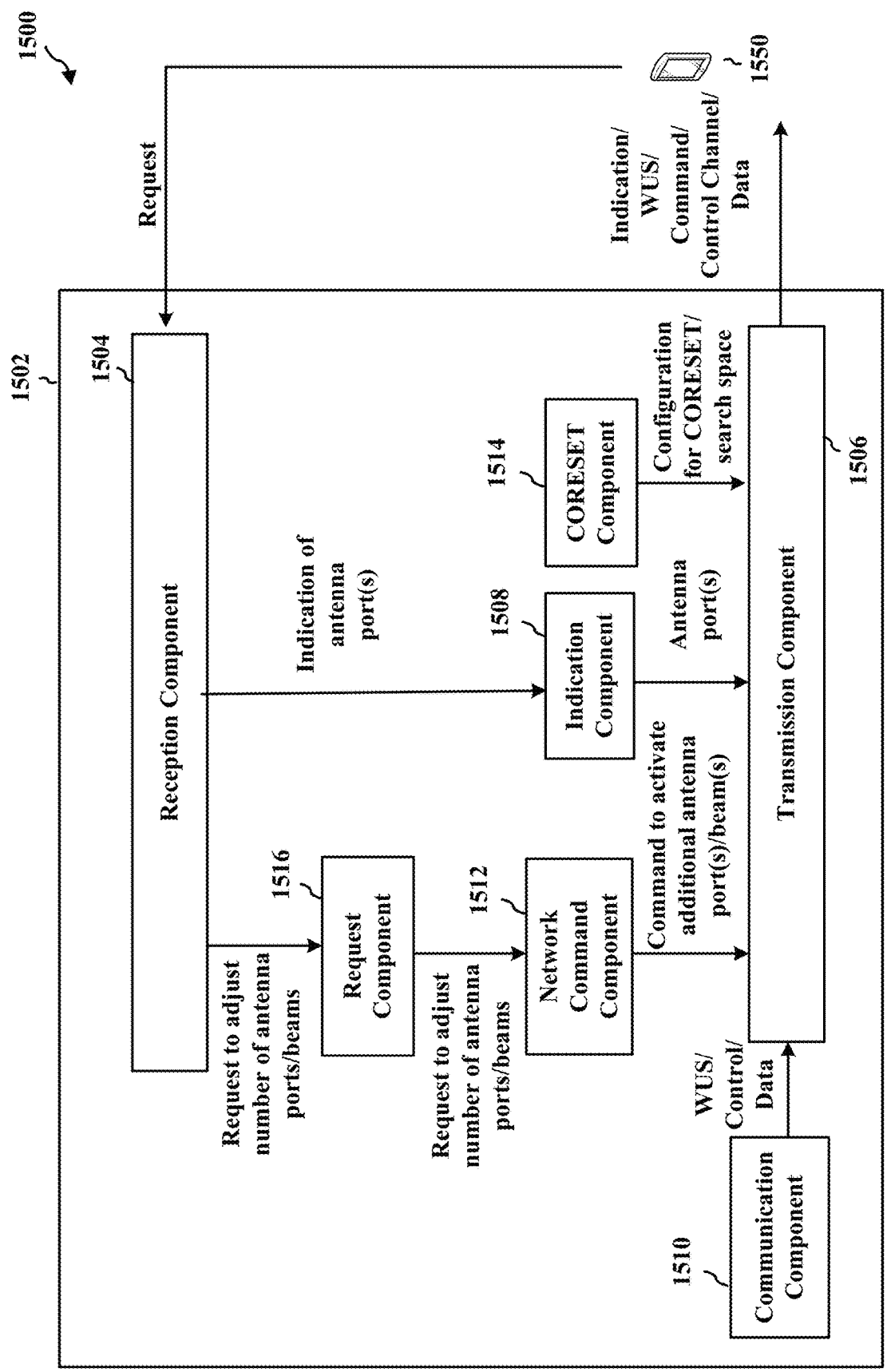
FIG. 15 is a conceptual data flow diagram illustrating the data flow between different means/components in an example apparatus of a base station, in accordance with certain aspects of the disclosure.

FIG. 15 is a conceptual data flow diagram 1500 illustrating the data flow between different means/components in an example apparatus 1502. The apparatus may be a base station (e.g., the base station 102, 180, 310, 604, 704, 1002, and/or 1250). The apparatus 1502 includes a reception component 1504, a transmission component 1506, an indication component 1508, a communication component 1510, a network command component 1512, a CORESET component 1514, and a request component 1516.

The apparatus 1502 includes the reception component 1504 that receives uplink communication from a UE 1550 and the transmission component 1506 that transmits downlink communication to the UE 1550. The apparatus 1502 may include the indication component 1508 configured to transmit an indication to the UE 1550 or receive an indication from the UE 1550 of at least one antenna port at the UE 1550 for use in a DRX cycle (e.g., as described in connection with 1402). The apparatus 1502 may include the communication component 1510 configured to transmit communication to the UE 1550 according to the DRX cycle based on the at least one antenna port (e.g., as described in connection with 1410). The apparatus 1502 may include the CORESET component 1514 configured to configure the UE 1550 with a CORESET or search space corresponding to at least one additional antenna port or at least one additional beam (e.g., as described in connection with 1408). The apparatus 1502 may include the network command component 1512 configured to transmit a network command from the base station to activate at least one additional antenna port or at least one additional beam (e.g., as described in connection with 1406). The apparatus 1502 may include the request component 1516 configured to receive a request for an adjustment in a number of antenna ports or beams from the UE 1550 (e.g., as described in connection with 1404). In some examples, the network command may be transmitted in response to the request from the UE 1550.

The apparatus may include additional components that perform each of the blocks of the algorithm in the aforementioned flowcharts of FIGS. 6, 7, and/or 14. As such, each block in the aforementioned flowcharts of FIGS. 6, 7, and/or 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
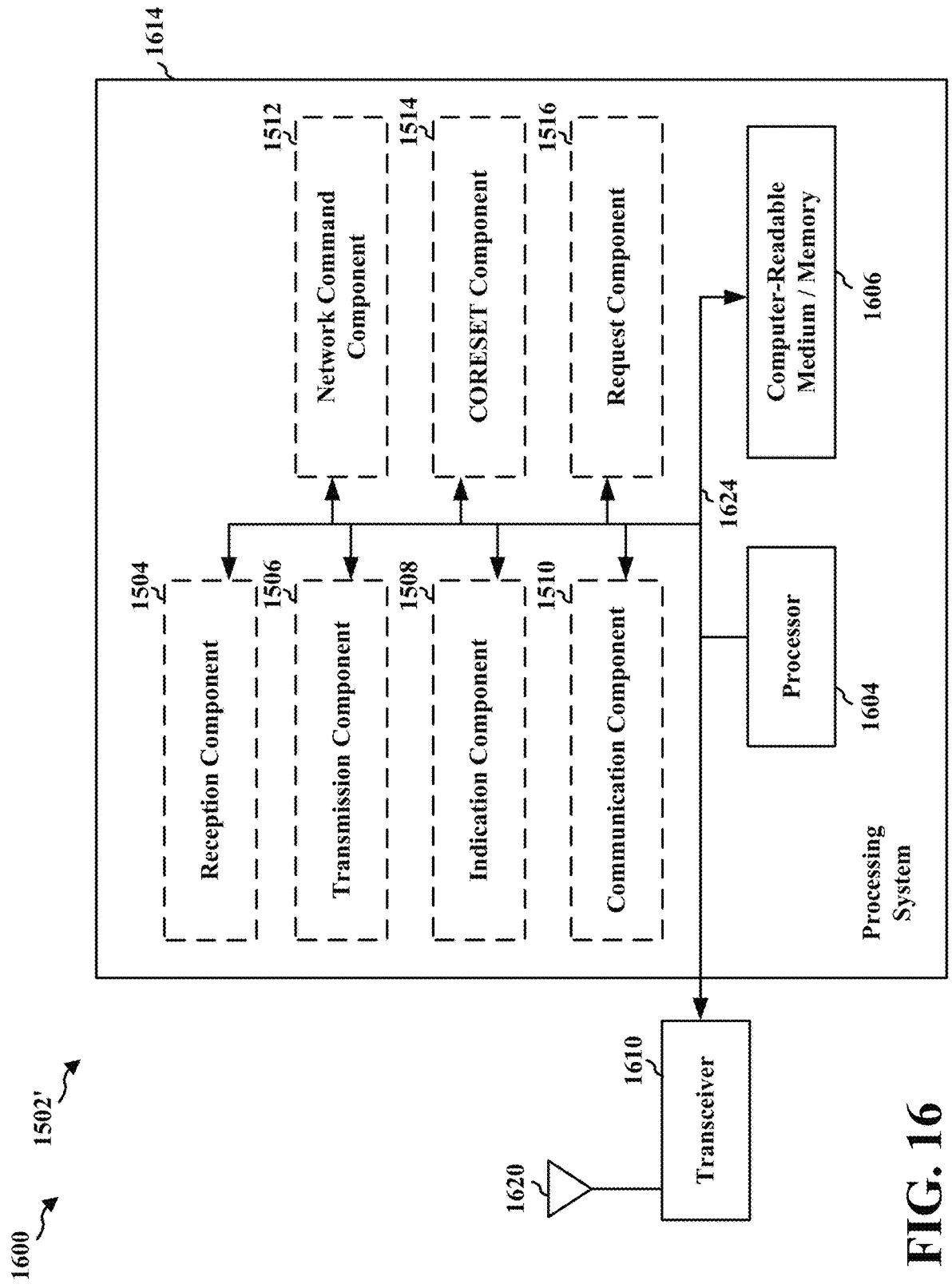
FIG. 16 is a diagram illustrating an example of a hardware implementation for an apparatus of a base station employing a processing system, in accordance with certain aspects of the disclosure.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, 1514, 1516, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1506, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512, 1514, 1516. The components may be software components running in the processor 1604, resident/stored in the computer readable medium/memory 1606, one or more hardware components coupled to the processor 1604, or some combination thereof. The processing system 1614 may be a component of the base station 310 and may include the memory 376 and/or at least one of the TX processor 316, the RX processor 370, and the controller/processor 375. Alternatively, the processing system 1614 may be the entire base station (e.g., see the base station 310 of FIG. 3).

In one configuration, the apparatus 1502/1502' for wireless communication includes means for transmitting to or receiving from a UE an indication of at least one antenna port at the UE for use in a DRX cycle. The apparatus may include means for transmitting communication to the UE according to the DRX cycle based on the at least one antenna port. The apparatus may include means for receiving a beam addition request from the UE to activate one or more additional corresponding antennas or antenna arrays. The apparatus may include means for transmitting a beam addition command to activate one or more additional corresponding antennas or antenna arrays. The apparatus may include means for receiving a beam reduction request from the UE to deactivate one or more corresponding antennas or antenna arrays. The apparatus may include means for receiving a beam reduction request from the UE to deactivate one or more corresponding antennas or antenna arrays. The apparatus may include means for configuring the UE with a CORESET or search space corresponding to at least one additional antenna port or at least one additional beam. The apparatus may include means for transmitting a network command from the base station to activate at least one additional antenna port or at least one additional beam, and where the network command is comprised in at least one of DCI, a MAC CE, RRC signaling, or a WUS. The apparatus may include means for receiving a request for an adjustment in a number of antenna ports or corresponding beams from the UE, and where the network command is transmitted in response to the request from the UE.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method of wireless communication at a UE, comprising: sending to or receiving from a base station an indication of at least one antenna port; entering a sleep mode as part of a DRX cycle; and monitoring for communication from the base station during the DRX cycle using the at least one antenna port.

In Example 2, the method of Example 1 further includes that the indication of the at least one antenna port comprises one or more of: a first indication of a set of antennas or antenna arrays and corresponding beams to be used for communication between the UE and the base station; a second indication of a beam to be used for communication between the UE and the base station; or a number of corresponding beams to be used for communication between the UE and the base station.

In Example 3, the method of any of Example 1 or Example 2 further includes: receiving a configuration indicating a CORESET or search space corresponding to the at least one antenna port, wherein the UE monitors for a control channel based on the configuration for the CORESET of the search space.

In Example 4, the method of any of Example 1 to Example 3 further includes that the entering of the sleep mode of the DRX cycle comprises deactivating one or more antenna or antenna arrays of the UE.

In Example 5, the method of any of Example 1 to Example 4 further includes that the monitoring for the communication from the base station comprises activating a first set of antennas or antenna arrays of the UE, the first set of antennas or antenna arrays corresponding to the at least one antenna port.

In Example 6, the method of any of Example 1 to Example 5 further includes that a second set of antennas or antenna arrays remain deactivated during the monitoring, the second set of antennas or antenna arrays comprising antennas or antenna arrays not corresponding to the at least one antenna port.

In Example 7, the method of any of Example 1 to Example 6 further includes that the indication of the at least one antenna port comprises a beam addition request sent by the UE to activate one or more additional corresponding antennas or antenna arrays.

In Example 8, the method of any of Example 1 to Example 7 further includes that the indication of the at least one antenna port comprises a beam addition command received from the base station to activate one or more additional corresponding antennas or antenna arrays.

In Example 9, the method of any of Example 1 to Example 8 further includes that the indication of the at least one antenna port comprises a beam reduction request sent by the UE to deactivate one or more corresponding antennas or antenna arrays.

In Example 10, the method of any of Example 1 to Example 9 further includes that the indication of the at least one antenna port comprises a beam reduction command received from the base station to deactivate one or more corresponding antennas or antenna arrays.

In Example 11, the method of any of Example 1 to Example 10 further includes that the communication from the base station comprises monitoring on a beam corresponding to the at least one antenna port.

In Example 12, the method of any of Example 1 to Example 11 further includes that the monitoring for the communication from the base station comprises monitoring using a strongest beam corresponding to the at least one antenna port.

In Example 13, the method of any of Example 1 to Example 12 further includes that the monitoring for the communication from the base station comprises monitoring for a control channel from the base station, wherein the UE activates at least one additional antenna port or at least one additional beam based on the control channel, and wherein the at least one additional antenna port or the at least one additional beam is activated to receive data from the base station.

In Example 14, the method of any of Example 1 to Example 13 further includes that the monitoring for the communication from the base station comprises monitoring for a WUS directed to the UE from the base station, wherein the UE activates at least one additional antenna port or at least one additional beam when the WUS directed to the UE is detected from the base station.

In Example 15, the method of any of Example 1 to Example 14 further includes that the at least one additional antenna port or the at least one additional beam is activated to monitor for a control channel or a data channel from the base station.

In Example 16, the method of any of Example 1 to Example 15 further includes: receiving a network command from the base station to activate at least one additional antenna port or at least one additional beam, wherein the network command is comprised in at least one of DCI, a MAC-CE, RRC signaling, or a WUS; and activating the at least one additional antenna port or the at least one additional beam in response to the network command.

In Example 17, the method of any of Example 1 to Example 16 further includes: transmitting a request for an adjustment in a number of antenna ports or corresponding beams to the base station prior to receiving the network command.

Example 18 is a system or apparatus including means for implementing a method or realizing an apparatus as in any of Examples 1 to 17.

Example 19 is a device including one or more processors and one or more memories in electronic communication with the one or more processors storing instructions executable by the one or more processors to cause a system or an apparatus to implement a method as in any of Examples 1 to 17.

Example 20 is a non-transitory computer-readable medium storing instructions executable by one or more processors to cause the one or more processors to implement a method as in any of Examples 1 to 17.

Example 21 is a method of wireless communication at a base station, comprising: transmitting to or receiving from a UE an indication of at least one antenna port at the UE for use in a DRX cycle; and transmitting communication to the UE according to the DRX cycle based on the at least one antenna port.

In Example 22, the method of Example 21 further includes that the indication of the at least one antenna port comprises one or more of: a first indication of a set of antennas or antenna arrays and corresponding beams to be used for communication between the UE and the base station; a second indication of a beam to be used for communication between the UE and the base station; or a number of corresponding beams to be used for communication between the UE and the base station.

In Example 23, the method of any of Example 21 or Example 22 further includes that the indication of the at least one antenna port comprises a beam addition request received from the UE to activate one or more additional corresponding antennas or antenna arrays.

In Example 24, the method of any of Example 21 to Example 23 further includes that the indication of the at least one antenna port comprises a beam addition command transmitted from the base station to activate one or more additional corresponding antennas or antenna arrays.

In Example 25, the method of any of Example 21 to Example 24 further includes that the indication of the at least one antenna port comprises a beam reduction request received from the UE to deactivate one or more corresponding antennas or antenna arrays.

In Example 26, the method of any of Example 21 to Example 25 further includes that the indication of the at least one antenna port comprises a beam reduction request received from the UE to deactivate one or more corresponding antennas or antenna arrays.

In Example 27, the method of any of Example 21 to Example 26 further includes that the communication comprises a control channel, wherein the control channel comprises control information for the UE.

In Example 28, the method of any of Example 21 to Example 27 further includes that the communication comprises a WUS directed to the UE.

In Example 29, the method of any of Example 21 to Example 28 further includes: configuring the UE with a CORESET or search space corresponding to at least one additional antenna port or at least one additional beam.

In Example 30, the method of any of Example 21 to Example 29 further includes: transmitting a network command from the base station to activate at least one additional antenna port or at least one additional beam, wherein the network command is comprised in at least one of DCI, a MAC-CE, RRC signaling, or a WUS.

In Example 31, the method of any of Example 21 to Example 30 further includes: receiving a request for an adjustment in a number of antenna ports or corresponding beams from the UE, wherein the network command is transmitted in response to the request from the UE.

Example 32 is a system or apparatus including means for implementing a method or realizing an apparatus as in any of Examples 21 to 31.

Example 33 is a device including one or more processors and one or more memories in electronic communication with the one or more processors storing instructions executable by the one or more processors to cause a system or an apparatus to implement a method as in any of Examples 21 to 31.

Example 34 is a non-transitory computer-readable medium storing instructions executable by one or more processors to cause the one or more processors to implement a method as in any of Examples 21 to 31.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
   sending, from the UE to a base station, an indication of at least one antenna port of the UE, or receiving, at the UE and from the base station, the indication of the at least one antenna port of the UE;
   entering, at the UE, a sleep mode as part of a Discontinuous Reception (DRX) cycle configured for the UE;
   monitoring, at the UE, for communication from the base station during the DRX cycle using the at least one antenna port of the UE; and
   communicating, at the UE, data with the base station during a same active duration of the DRX cycle configured for the UE, the communicating of the data during the same active duration of the DRX cycle using at least one additional antenna port of the UE in addition to the at least one antenna port of the UE, or at least one additional beam in addition to the at least one antenna port of the UE, and
   wherein the at least one additional antenna port or the at least one additional beam is based in part on the indication of the at least one antenna port of the UE.

2. The method of claim 1, wherein the indication of the at least one antenna port of the UE comprises one or more of:
   a first indication of a set of antennas or antenna arrays and corresponding beams to be used for communication between the UE and the base station;
   a second indication of a beam to be used for communication between the UE and the base station; or
   a number of corresponding beams to be used for communication between the UE and the base station.

3. The method of claim 2, further comprising:
   receiving a configuration indicating a Control Resource Set (CORESET) or search space corresponding to the at least one antenna port of the UE, wherein the UE monitors for a control channel based on the configuration for the CORESET or the search space.

4. The method of claim 1, wherein the entering of the sleep mode of the DRX cycle comprises deactivating one or more antenna or antenna arrays of the UE.

5. The method of claim 1, wherein the monitoring for the communication from the base station comprises activating a first set of antennas or antenna arrays of the UE, the first set of antennas or antenna arrays corresponding to the at least one antenna port of the UE.

6. The method of claim 5, wherein a second set of antennas or antenna arrays of the UE remain deactivated during the monitoring, the second set of antennas or antenna arrays of the UE comprising antennas or antenna arrays not corresponding to the at least one antenna port of the UE.

7. The method of claim 1, wherein the indication of the at least one antenna port of the UE comprises a beam addition request sent by the UE to activate one or more additional corresponding antennas or antenna arrays of the UE.

8. The method of claim 1, wherein the indication of the at least one antenna port of the UE comprises a beam addition command received from the base station to activate one or more additional corresponding antennas or antenna arrays of the UE.

9. The method of claim 1, wherein the indication of the at least one antenna port of the UE comprises a beam reduction request sent by the UE to deactivate one or more corresponding antennas or antenna arrays of the UE.

10. The method of claim 1, wherein the indication of the at least one antenna port of the UE comprises a beam reduction command received from the base station to deactivate one or more corresponding antennas or antenna arrays of the UE.

11. The method of claim 1, wherein the monitoring for the communication from the base station comprises monitoring on a beam corresponding to the at least one antenna port of the UE.

12. The method of claim 11, wherein the monitoring for the communication from the base station comprises monitoring using a strongest beam corresponding to the at least one antenna port of the UE.

13. The method of claim 1, wherein the monitoring for the communication from the base station comprises monitoring for a control channel from the base station, wherein the UE activates the at least one additional antenna port of the UE or the at least one additional beam of the UE based on the control channel, and wherein the at least one additional antenna port of the UE or the at least one additional beam of the UE is activated to receive data from the base station.

14. The method of claim 1, wherein the monitoring for the communication from the base station comprises monitoring for a Wake Up Signal (WUS) directed to the UE from the base station, wherein the UE activates the at least one additional antenna port of the UE or the at least one additional beam of the UE when the WUS directed to the UE is detected from the base station.

15. The method of claim 14, wherein the at least one additional antenna port of the UE or the at least one additional beam of the UE is activated to monitor for a control channel or a data channel from the base station.

16. The method of claim 1 further comprising:
receiving a network command from the base station to activate the at least one additional antenna port of the UE or the at least one additional beam of the UE, wherein the network command is comprised in at least one of downlink control information (DCI), a medium access control (MAC) control element (CE), radio resource control (RRC) signaling, or a Wake Up Signal (WUS); and
activating the at least one additional antenna port of the UE or the at least one additional beam of the UE in response to the network command.

17. The method of claim 16, further comprising:
transmitting a request for an adjustment in a number of antenna ports or corresponding beams to the base station prior to receiving the network command.

18. An apparatus for wireless communication at a User Equipment (UE), comprising:
a memory; and
at least one processor coupled to the memory and configured to:
send, from the UE to a base station, an indication of at least one antenna port of the UE, or receive, at the UE and from the base station, the indication of the at least one antenna port of the UE;
enter, at the UE, a sleep mode as part of a Discontinuous Reception (DRX) cycle configured for the UE;
monitor, at the UE, for communication from the base station during the DRX cycle using the at least one antenna port of the UE; and
communicate, at the UE, data with the base station during a same active duration of the DRX cycle configured for the UE, the communicating of the data during the same active duration of the DRX cycle using
at least one additional antenna port of the UE in addition to the at least one antenna port of the UE, or
at least one additional beam in addition to the at least one antenna port of the UE, and
wherein the at least one additional antenna port or the at least one additional beam is based in part on the indication of the at least one antenna port of the UE.

19. A method of wireless communication at a base station, comprising:
transmitting, from the base station to a User Equipment (UE), an indication of at least one antenna port of the UE for use in a Discontinuous Reception (DRX) cycle configured for the UE, or receiving, at the base station and from the UE, the indication of the at least one antenna port of the UE for use in the DRX cycle configured for the UE;
transmitting communication, from the base station, to the UE according to the DRX cycle based on the at least one antenna port of the UE; and
communicating, at the base station, data with the UE during a same active duration of the DRX cycle configured for the UE, the communication of the data during the same active duration of the DRX cycle using
at least one additional antenna port of the UE in addition to the at least one antenna port of the UE, or at least one additional beam in addition to the at least one antenna port of the UE, and
wherein the at least one additional antenna port or the at least one additional beam is based in part on the indication of the at least one antenna port of the UE.

20. The method of claim 19, wherein the indication of the at least one antenna port of the UE comprises one or more of:
a first indication of a set of antennas or antenna arrays and corresponding beams to be used for communication between the UE and the base station;
a second indication of a beam to be used for communication between the UE and the base station; or
a number of corresponding beams to be used for communication between the UE and the base station.

21. The method of claim 19, wherein the indication of the at least one antenna port of the UE comprises a beam addition request received from the UE to activate one or more additional corresponding antennas or antenna arrays of the UE.

22. The method of claim 19, wherein the indication of the at least one antenna port of the UE comprises a beam addition command transmitted from the base station to activate one or more additional corresponding antennas or antenna arrays of the UE.

23. The method of claim 19, wherein the indication of the at least one antenna port of the UE comprises a beam reduction request received from the UE to deactivate one or more corresponding antennas or antenna arrays of the UE.

24. The method of claim 19, wherein the indication of the at least one antenna port of the UE comprises a beam reduction request received from the UE to deactivate one or more corresponding antennas or antenna arrays of the UE.

25. The method of claim 19, wherein the communication comprises a control channel, wherein the control channel comprises control information for the UE.

26. The method of claim 19, wherein the communication comprises a Wake Up Signal (WUS) directed to the UE.

27. The method of claim 19, further comprising:
configuring the UE with a Control Resource Set (CORESET) or search space corresponding to the at least one additional antenna port of the UE or the at least one additional beam of the UE.

28. The method of claim 19, further comprising:
transmitting a network command from the base station to activate the at least one additional antenna port of the UE or the at least one additional beam of the UE, wherein the network command is comprised in at least one of downlink control information (DCI), a medium access control (MAC) control element (CE), radio resource control (RRC) signaling, or a Wake Up Signal (WUS).

29. The method of claim 28, further comprising:
receiving a request for an adjustment in a number of antenna ports or corresponding beams from the UE, wherein the network command is transmitted in response to the request from the UE.

30. An apparatus for wireless communication at a base station, comprising:
a memory; and
at least one processor coupled to the memory and configured to:
transmit, from the base station to a User Equipment (UE), an indication of at least one antenna port of the UE for use in a Discontinuous Reception (DRX) cycle configured for the UE, or receive, at the base station and from the UE, the indication of the at least one antenna port of the UE for use in the DRX cycle configured for the UE;
transmit communication, from the base station, to the UE according to the DRX cycle based on the at least one antenna port of the UE; and
communicate, at the base station, data with the UE during a same active duration of the DRX cycle configured for the UE, the communication of the data during the same active duration of the DRX cycle using
at least one additional antenna port of the UE in addition to the at least one antenna port of the UE, or at least one additional beam in addition to the at least one antenna port of the UE, and
wherein the at least one additional antenna port or the at least one additional beam is based in part on the indication of the at least one antenna port of the UE.

* * * * *